(12) United States Patent
Ashikawa et al.

(10) Patent No.: US 6,719,232 B1
(45) Date of Patent: Apr. 13, 2004

(54) MAGNETIC TAPE CASSETTE

(75) Inventors: Teruo Ashikawa, Kanagawa (JP); Shozo Onmori, Kanagawa (JP); Kazuo Hiraguchi, Kanagawa (JP); Hiroyuki Naito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/856,780
(22) PCT Filed: Nov. 26, 1999
(86) PCT No.: PCT/JP99/06625
§ 371 (c)(1),
(2), (4) Date: May 25, 2001
(87) PCT Pub. No.: WO00/33309
PCT Pub. Date: Jun. 8, 2000

(30) Foreign Application Priority Data

Nov. 30, 1998 (JP) ............................. 10-339848

(51) Int. Cl.$^7$ ............................. G11B 23/087
(52) U.S. Cl. ................... 242/344; 360/132
(58) Field of Search ................ 242/338, 344, 242/348; 360/132

(56) References Cited

U.S. PATENT DOCUMENTS 5,390,870 A * 2/1995 Sawada et al. ............ 242/344
5,541,796 A   7/1996 Sawada ..................... 360/132

FOREIGN PATENT DOCUMENTS

| JP | 60-258783 | 12/1985 | ......... G11B/23/087 |
| JP | 64-24574  | 2/1989  | ......... G11B/23/087 |
| JP | 6-259928  | 9/1994  | ........... G11B/23/30 |

* cited by examiner

Primary Examiner—John Q. Nguyen
(74) Attorney, Agent, or Firm—Sughrue Mion, PLLC

(57) ABSTRACT

A magnetic tape cassette includes an ID board for enabling a hardware to identify the magnetic tape by bringing contacts on a circuit board of the ID board which are exposed through an opening formed in a lower cassette half into contact with corresponding contacts in the hardware. Additionally, a plating treatment is provided on the contacts on the ID board. Further, a determined distance is secured between all end portions of the parts of the circuit board. Which are provided with the plating treatment, and the end faces of the circuit board. In an illustrative, non-limiting embodiment, the determined distance of the ID boards at a forward position in a moving direction of the magnetic tape cassette at which the contacts on the ID board are adapted to slidably contact with the contacts in the hardware is set to be 0.05–0.25 mm.

4 Claims, 21 Drawing Sheets (a)

(b)

Fig. 24    PRIOR ART
(a)
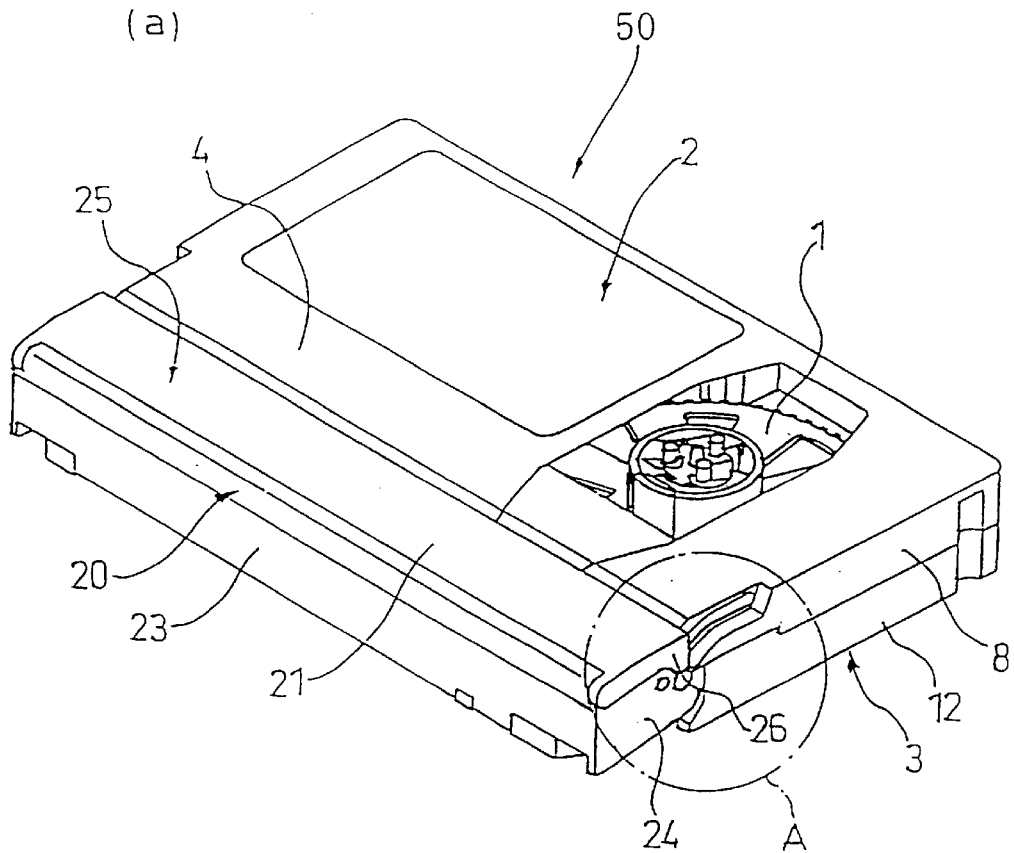
(b)
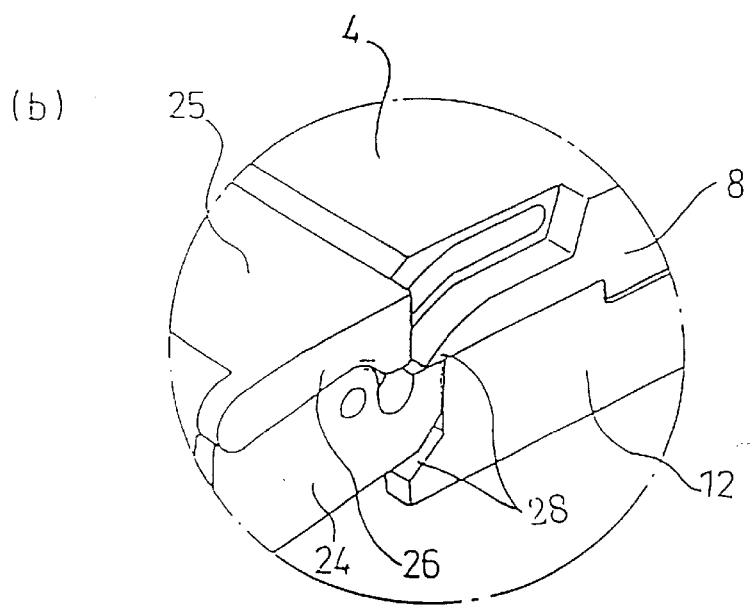

(a)

(b)

MAGNETIC TAPE CASSETTE

TECHNICAL FIELD

The present invention relates to a magnetic tape cassette such as a digital video cassette (DVC) or the like.

BACKGROUND OF THE INVENTION

Generally, in an audio apparatus, a video apparatus and the like, there are in many cases used magnetic tape cassettes of a structure that a magnetic tape wound around a pair of tape reels is held inside a cassette case so as to run for conducting recording and reproducing.

FIG. 12 is an exploded perspective view of the DVC which is one example of the magnetic tape cassette. The magnetic tape cassette 50 comprises an upper cassette half 2 and a lower cassette half 3 each of which has a flat plate and peripheral walls. These upper and lower cassette halves 2, 3 are assembled and fastened by means of a plurality of screws. A pair of tape reels 1 which are formed by welding their upper flanges with their lower flanges are rotatably supported in the lower cassette half 3 in a state where a magnetic tape 47 is wound around the tape reels 1.

There are provided tape guides 14 at both sides of an opening 5 which is formed at a front end side (a lower side in the drawing) of the lower cassette half 3. Each of the tape guides 14 is adapted to guide the magnetic tape 47 which is fed from one of the tape reels 1 and taken up by the other tape reel and to pass the magnetic tape 47 at a determined position corresponding to the opening 5.

A tape reel locking member 16 having a tape reel locking arm 15 is assembled to a rear end side (an upper side in the drawing) of the lower cassette half 3. The tape reel locking member 16 is biased by means of a compression coil spring 17 so as to engage the tape reel locking arm 15 with an engaging tooth which is formed at an outer circumference of the lower flange of each of the tape reels 1 thereby to block an accidental rotation of the tape reel 1. A slackened winding of the magnetic tape 47 can be prevented with this arrangement.

To the flat plate 4 of the upper cassette half 2 are fitted reel pressing leaf springs 48 for the respective tape reels 1. Each of the reel pressing leaf springs 48 is supported by the upper cassette half 2 in a cantilever manner so as to push the corresponding tape reel 1 toward the lower cassette half 3. Further, the flat plate 4 of the upper cassette half 2 is provided with an opening which extends in a transverse direction of the flat plate 4 at one side of the flat plate 4 in its longitudinal direction (a right hand in the drawing) so that an amount of winding of the magnetic tape 47 on the tape reels 1 can be confirmed. A transparent window member 49 is fitted so as to close the opening.

To a front end side of the upper cassette half 2 are freely and openably fitted an outer lid 20, a top lid 21 and an inner lid 22 for covering a front and a back faces of the magnetic tape 47 which is stretched between a pair of the tape guides 14 in the lower cassette half 3, in order to obtain such a dust proofing property as durable for an outdoor use.

FIG. 13 shows one of the tape guides 14 which are provided in the lower cassette half 3 and shown in FIG. 12. Generally, the tape guide is uprightly provided on the flat plate of the lower cassette half. In this case, a hollow, that is, cylindrically formed tape guide 14 is integrally formed on the flat plate 10 of the lower cassette half 3. The tape guide 14 includes a curved portion 30 with which the magnetic tape 47 slidably contacts, and flat portions 31a, 31b at a rear end side (an upper side in the drawing) and at an inner side (a left hand in the drawing) of the tape guide respectively with which the magnetic tape 47 does not contact. In this case, the tape guide 14 is formed in such a manner that a thickness of the tape guide 14 is substantially constant in a circumferential direction, and therefore, the curved portion 30 and the flat portions 31a, 31b are substantially equal to each other in thickness.

When the lower cassette half 3 is formed by molding, a molten resin introduced into a mold fills at first a cavity for the flat plate 10. Then, the molten resin flows into cavities for the tape guides 14 connected to the cavity for the flat plate 10 and into cavities for other members.

There has been sometimes formed a weld line (hereinafter referred to as "a weld") W on a surface of the curved portion 30 of the tape guide 14 as shown in FIG. 14, when the lower cassette half 3 of the above described magnetic tape cassette 50 is molded. In addition, a pock v of an air bubble which is generated when the air bubble is discharged has been also formed in some cases on the surface of the curved portion 30. There is a fear that such a weld W or an air bubble pock v may damage the magnetic tape if they are formed on the surface of the curved portion 30 with which the magnetic tape slidably contacts.

The term "weld" means herein a thin line which is formed at a portion where two or more streams of the molten resin join, and the term "air bubble" means a hollow spot which is formed inside a molded article.

A first object of the invention is to provide a magnetic tape cassette which is free from molding defects on the surface of the curved portion of the tape guide with which the magnetic tape slidably contacts.

FIG. 15 shows a manner of placing the window member 49 on the flat plate 4 so as to close the opening formed in the flat plate 4, when the window member 49 shown in FIG. 12 is welded to the flat plate 4 of the upper cassette half 2. As shown in FIG. 15, this work is generally conducted by hand.

An inner face (an upper face in the drawing) of the flat plate 4 of the upper cassette half 2 is formed at a peripheral part of the opening with a stepped flat face 35a (hereinafter referred to as "a window supporting face") which is recessed from other parts of the inner face of the flat plate. The window supporting face 35a supports the peripheral edge of the window member 49, when the window member 49 is placed on the flat plate 4. A side face 35b between the inner face of the flat plate 4 and the window supporting face 35a is formed in a tapered shape which serves as an introducing face for guiding the window member 49 to the window supporting face 35a.

FIG. 16 shows a sectional view taken along a line Y—Y in FIG. 15 in a state where the window member 49 has been placed on the flat plate 4. As shown in FIG. 16, a peripheral wall (a back end wall) 7 of the upper cassette half 2 is provided at its outer face with a recess 7a to which a label is to be attached. A peripheral edge of the window member 49 is arranged close to an inner face of a base portion of the peripheral wall 7.

A part of an outer face (a lower face in the drawing) of the window member 49 which is supported by the window supporting face 35a is in a form of a stepped flat face 49a (hereinafter referred to as "a supported face") which is recessed from other parts of the outer face of the window member. The supported face 49a is projectingly provided with a welded rib 49b in a shape of a triangle in section, which is adapted to abut against the window supporting face 35a of the flat plate 4 when the window member 49 is placed on the flat plate 4.

FIG. 17 shows another upper cassette half 52 which has been conventionally used. The flat plate 4 of the upper cassette half 52, similarly to the upper cassette half 2 shown in FIG. 16, has the window supporting face 35a, and the side face 35b connecting the inner face of the flat plate to the window supporting face 35a is formed in a tapered face. A positioning rib 45 having a side face which is vertical with respect to the inner face of the flat plate is formed at the inner face of the base portion of the peripheral wall 7. In such an upper cassette half 52, the window member 49 can be accurately positioned on the flat plate 4 without affecting its mountability, by precisely forming the side face of the positioning rib 45.

In order to weld the window member 49 to the flat plate 4 of the upper cassette half 2 as shown in FIG. 16, when the window member 49 is placed on the flat plate 4 and released from the hand, the window member 49 sometimes adheres to the hand by static electricity, etc. and floats up from the flat plate 4, as shown by a two-dot chain line in FIG. 18. In case where the window member 49 is released from the hand in the air, an accurate positioning of the window member 49 on the flat plate 4 may be sometimes impossible, so that the supported face 49a of the window member may ride on the inner face of the flat plate, as shown by a solid line in FIG. 18, for example.

Also in case where the window member 49 is placed on the flat plate 4 of the upper cassette half 52 as shown in FIG. 17, when the window member 49 is released from the hand, the window member sometimes adheres to the hand and floats up from the flat plate 4 as shown by a two-dot chain line in FIG. 19. When the window member 49 is released from the hand in the air, the supported face 49a of the window member may sometimes tide on the upper face of the positioning rib 45 as shown by a solid line in FIG. 19.

As described above, the work for accurately positioning the window member 49 on the flat plate 4 has been very annoying, and an improvement of the work has been required.

A second object of the invention is to provide a magnetic tape cassette in which the window member can be easily placed on an accurate position of the flat plate, when the window member is fitted to the flat plate of the upper cassette half.

As shown in FIG. 20, at a corner part of the rear end wall 7 of the upper cassette half 2, is formed an opening 34 for exposing a safety lug for preventing a wrong erasure of recorded data on the magnetic tape. Moreover, at a corner part of a rear end wall 11 of the lower cassette half 3 are formed openings 37 for exposing contacts of an ID board for identifying a type and a use of the magnetic tape.

FIG. 21 is a plan view of the ID board. The ID board 33 has a plurality of (four in FIG. 21) contacts 36 which are exposed through the openings 37 formed in the lower cassette half. Signals concerning the type and the use of the magnetic tape are exchanged between the ID board and a recording and reproducing apparatus (a hardware) by way of the contacts 36. The ID board is manufactured through the following steps:

First of fall, a copper foil is applied to a printed circuit board 38 formed of a substrate material such as a glass reinforced epoxy resin or the like, and after a desired pattern has been printed (etched) on the board, the copper foil is removed from unnecessary parts thereby to form the copper foil of a desired shape (rectangular in FIG. 21) which constitutes the contacts 36. Then, after the printed circuit board 38 is rinsed, the copper foil is plated with gold. Plating the copper foil with gold is an indispensable treatment for preventing a faulty detection due to repeated sliding motions of the ID board with respect to the hardware. Finally, by stamping by means of a stamping die, the printed circuit board 38 is formed in such a desired shape (flat plate like and substantially L-shaped in FIG. 21) as the printed circuit board 38 can be received in the lower cassette half.

There has been a problem that on occasion that the printed circuit board 38 of ID board 33 is stamped on the stamping die, a minute burr 39 may be created at an end face of each of the contacts 36 of the printed circuit board 38 in a direction of an arrow B in FIG. 22, and partial damages 40 or the like may be caused on the gold plating on the copper foil by the burr 39. When the burr on the gold plating and the partial damages 40 or the like have occurred, there has been a fear that while the magnetic tape cassette 50 is repeatedly inserted into and removed from the hardware 43 as shown in FIG. 23, the burrs may be spread further to reach to an insulating part, or a broken piece may adhere to the insulating part to cause a short of the printed circuit board 38.

A third object of the invention is to provide a magnetic tape cassette in which the partial damages of the plating on the contacts due to the minute burrs in the ID board can be reliably avoided, whereby a short of the circuit board of the ID board can be reliably prevented.

As shown in FIG. 12, the upper cassette half 2 of the magnetic tape cassette 50 includes the flat plate 4, the rear end wall 7, the front end wall 6 having the opening 5, and a left and a right side walls 8 which are positioned at outermost sides in a longitudinal direction of the upper cassette half 2. The lower cassette half 3 includes the flat plate 10, the rear end wall 11, the front end wall 13 having the opening 5, and a left and a right side walls 12 which are positioned at outermost sides in a longitudinal direction of the lower cassette half 3. The outer lid 20 includes a lid front face 23 and two lid side faces 24. The top lid 21 includes a lid upper face 25 and two lid side faces 26. The top lid 21 has an inner lid 22 rotatably fitted thereto.

FIG. 24 is a perspective view of an assembled product of the magnetic tape cassette 50. FIG. 24A is an overall view of the assembled product, FIG. 24B is an enlarged view of an encircled part A in FIG. 24A.

FIG. 25 is a plan view of the assembled product of the magnetic tape cassette 50 as shown in FIG. 24. FIG. 25A is an overall view of the assembled product, and FIG. 25B is an enlarged view of an encircled part B in FIG. 25A.

Longitudinal dimensions of the outer lid 20 and the top lid 21 are slightly smaller than a longitudinal dimension of the cassette case consisting of the upper cassette half 2 and the lower cassette half 3 assembled together. As shown in FIG. 25B, the end walls 8, 12 of the cassette case extend outwardly (leftward and rightward in FIG. 25) beyond the lid side faces 24, 26 in a longitudinal direction of the cassette case. They are thus designed so that the outer lid 20 and the top lid 21 may not project beyond the side walls 8, 12 of the cassette case, even though the outer lid 20 and the top lid 21 move in the longitudinal direction to be displaced toward one side by an amount Di of the displacement, when the magnetic tape cassette 50 is loaded in the hardware. With this design, the loading of the magnetic tape cassette 50 in the hardware can be smoothly conducted.

However, because the cassette case is so constructed as to project in the longitudinal direction beyond the lids as described above, in case where a user unintentionally happens to load the cassette 50 inclinedly in the hardware, front edges 28 of the projecting side walls 8, 12 of the cassette case may sometimes collide against a cassette loading mouth in the hardware. Moreover, when the cassette is forced to be loaded, the front edges 28, the outer lid 20 and the inner lid 21 will be caught inside the cassette loading mouth and can not be taken out of the hardware in the worst case.

A fourth object of the invention is to provide a magnetic tape cassette which can be smoothly loaded in the recording and reproducing apparatus, even in case where the user unintentionally happens to load the cassette inclinedly in the recording and reproducing apparatus.

DISCLOSURE OF THE INVENTION

The inventors of the invention have earnestly studied and found out that the above described first object can be attained by making the thickness of the curved portion of the tape guide larger than the thickness of the other parts such as the flat portions.

A magnetic tape cassette according to the invention comprises a lower cassette half having tape guides integrally formed therewith and an upper cassette half assembled to the upper cassette half to form a cassette case, a pair of tape reels around which a magnetic tape is wound being rotatably supported inside the cassette case, the magnetic tape being guided by the tape guides so as to run at a determined position, and is characterized in that each of the tape guides includes a cylindrical part having in its circumferential direction a curved portion with which the magnetic tape slidably contacts, the curved portion having a thickness larger than those of other circumferential portions of the cylindrical part.

In the magnetic tape cassette of the above described structure, molding defects will not happen on a surface of the curved portion of the tape guide, when the upper cassette half is molded.

Because the conventional tape guide has been formed in such a manner that the curved portion and the other portions such as the flat portions are substantially equal to each other in thickness, the molten resin has filled the cavity for the flat portion first of all at molding, and the streams of the molten resin flowed from both circumferential sides have sometimes joined in the cavity for the curved portion. In such case, the welds or the like have been formed on the surface of the curved portion of the tape guide.

According to the invention, because the thickness of the curved portion is larger than the thickness of the other portions such as the flat portions, and the molten resin fills at first the cavity for the curved portion which is wider and easier to receive the flow, and then fills the cavities for the flat portions. Accordingly two streams of the resin will not join in the cavity for the curved portion so that occurrence of the welds or the like can be prevented.

According to the invention, the thickness of the curved portion of the tape guide may be larger than the thickness of the other portions in circumferential direction of the tape guide, and the thickness of the curved portion is preferably one and a half (1.5) to three (3) times as large as the thickness of the other portions. With this design, the occurrence of the molding defects on the surface of the curved portion will be more remarkably prevented.

The second object of the invention can be attained by a magnetic tape cassette which comprises an upper cassette half having a flat plate provided with a peripheral wall and an opening, a window member of a separate body being fitted to the upper cassette so as to close the opening, and a lower cassette assembled to the upper cassette half to form a cassette case, a pair of tape reels around which a magnetic tape is wound being rotatably supported inside the cassette case, characterized in that the peripheral wall is provided with a positioning rib which extends from a base portion of the peripheral wall up to a position higher than a half of a height of the peripheral wall, the positioning rib being adapted to abut against a part of a circumferential edge of the window member.

In case where the positioning rib does not extend up to the half of the height of the peripheral wall from the base portion of the peripheral wall, the window member is likely to adhere to the hand and float up when the window member is released from the hand, and when the window member is released from the hand in the air, the window member will not be placed at the accurate position on the flat plate in some cases.

In the magnetic tape cassette of the above described structure, when the window member is fitted to the flat plate of the upper cassette half, the window member can be easily placed at the accurate position on the flat plate.

In case where the window member is fitted to the upper cassette half of the magnetic tape cassette of the above described structure, when the window member is released from the hand after it has been placed on the flat plate, it is preferable to slide the fingers or the like which are in contact with the window member along the window member by withdrawing the hand toward the peripheral wall which is provided with the positioning rib. With this motion, the window member can be prevented from floating up from the flat plate.

The peripheral wall of the upper cassette half may be provided with a plurality of positioning ribs, but even a single positioning rib can fully achieve the function.

According to the invention, the height of the positioning rib is a half or more of the height of the peripheral wall and the same or less as the height of the peripheral wall. A difference in height between the peripheral wall and the positioning rib is preferably 2 mm or less. With this design, the window member can be more reliably placed at the accurate position on the flat plate.

The third object of the invention can be attained by a magnetic tape cassette which comprises an ID board for enabling a hardware to identify the magnetic tape by bringing contacts on a circuit board which is exposed through an opening formed in a lower cassette half into contact with corresponding contacts in the hardware, characterized in that a plating treatment is provided on the contacts on the ID board, and that a determined distance is secured between all end portions of the parts provided with the plating treatment and end faces of the circuit board.

In the magnetic tape cassette according to the invention, the ID board enables the hardware to identify the type or the use of the magnetic tape by bringing the contacts on the board exposed through an opening which is formed in the lower cassette half into contact with the corresponding contacts in the hardware. The plating treatment is provided on the contacts of the ID board. Because a determined distance is secured between the end portions of the plated parts and the end faces of the board, a stamping cutter will not abut against the plated parts when the board is stamped by means of a press. Accordingly, the burrs and damages will not be generated on the plated parts and shorts of the contacts by a metal piece can be prevented beforehand.

In this case, all the end portions of the plated parts means entire peripheral edges of the plated parts, and in case where the rectangular parts are plated as shown in FIG. 21, all the four edges of each the rectangular part are meant. The end face of the board means a face around the board which is substantially perpendicular to a direction of a plane of the board.

From a view point of preventing the occurrence of the burrs which may be a cause of the shorts, the distance had better be as large as possible. However, as shown in FIG. 23, the magnetic tape cassette 50 is loaded in the hardware 43 while the plated parts 36 of the ID board 33 are slid in a direction of an arrow C with respect to the corresponding contacts 44 of the hardware. Accordingly, in case where the distance is too large, it may happen that the exposed parts of the ID board 33 (those parts not plated) will get to slidingly contact with the contacts 44 and a reliable detection of the contact will be impossible. Therefore, the distance at the forward end in the sliding direction of the arrow C among these distances is preferably 0.25 mm or less in view of electrically stable detection of the contacts.

Meanwhile, having earnestly studied and examined the burrs or damages in question with respect to size, their sizes were found to be between about 0.02–0.1 mm.

Therefore, considering stability of the above described contact detection and variations in working precision, the distance at the forward end is 0.05–0.25 mm and preferably 0.1–0.15 mm.

The fourth object of the invention can be attained by a magnetic tape cassette which comprises a cassette case consisting of an upper and a lower cassette halves, a pair of tape reels around which a magnetic tape contained in the cassette case is wound, and an openable lid fitted to the cassette case so as to cover an opening along which the magnetic tape arranged at a front side of the cassette case is adapted to pass, characterized in that side faces of the cassette case are provided with cut away portions so that forward ends of the side faces of the cassette case maybe always located closer to an inner space of the cassette case than side faces of the openable lid.

According to the above described structure of the invention, even in case where the cassette is loaded in a cassette loading mouth with the openable lid displaced toward one side and inclinedly with respect to the cassette loading mouth, the cassette will not be caught and can be smoothly guided into the interior of the hardware, because the forward ends of the side faces of the cassette case may be always located closer to the inner space of the cassette case than the side faces of the openable lid due to the presence of the cut away portions. Therefore, the magnetic tape cassette can be smoothly loaded in the hardware.

The cut away portion may be of a tapered or a curved shape.

BRIEF DESCRIPTION OF THE DRAWINGS

FIGS. 24A and 24B are a perspective view of the conventional magnetic tape cassette, and an enlarged perspective view of an essential part thereof respectively.

BEST MODE FOR CARRYING OUT THE INVENTION

Figure 1:
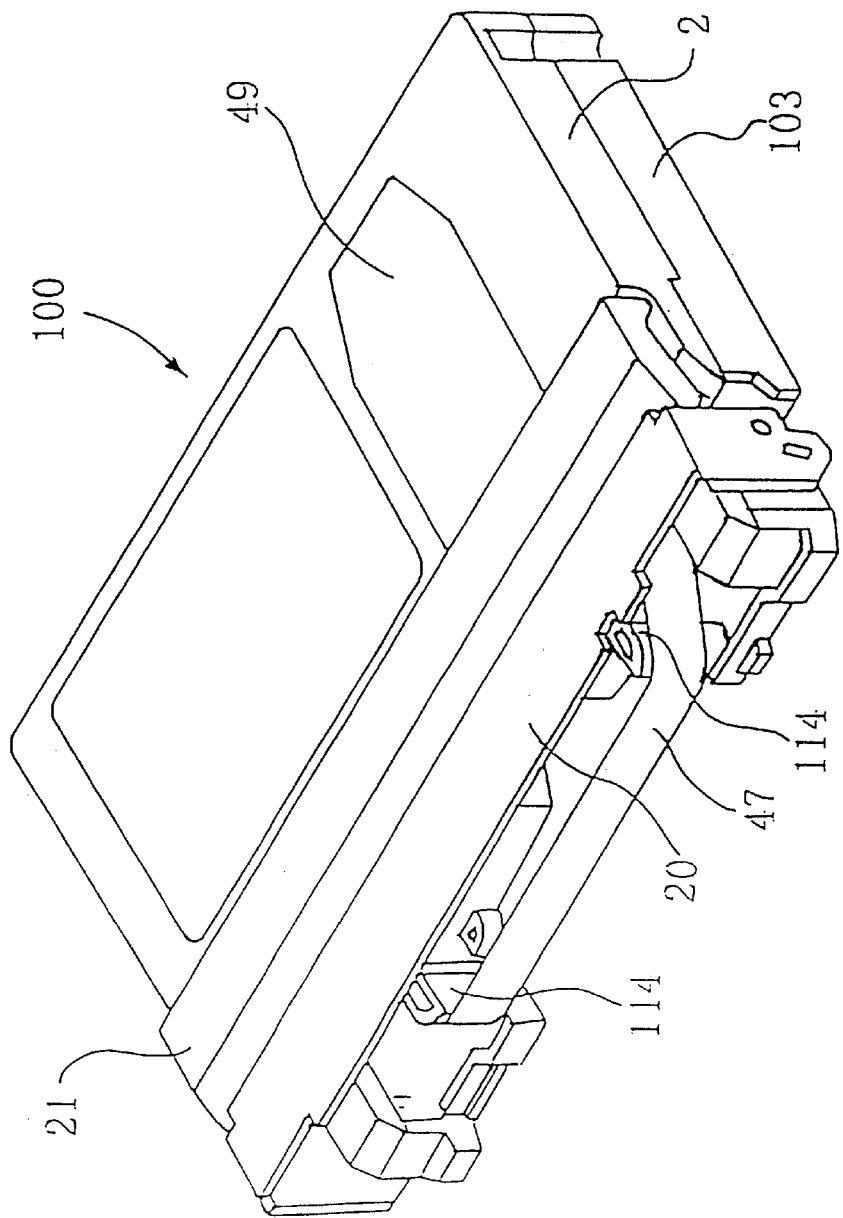
FIG. 1 is a view showing a magnetic tape cassette according to a first embodiment of the invention.

Now, embodiments of the invention will be described in detail with reference to the drawings. Those members which have been already described will be denoted with the same or equivalent reference numerals and signs to simplify or omit a further explanation.

FIG. 1 shows a magnetic tape cassette according to a first embodiment of the invention. The magnetic tape cassette 100 comprises an upper cassette half 2 and a lower cassette half 103 assembled into a cassette case, in which a pair of tape reels wound with a magnetic tape 47 are rotatably supported. In the magnetic tape cassette 100, the magnetic tape 47 is guided by means of a pair of tape guides 114 which are integrally formed with the lower cassette half 103 so that the magnetic tape 47 can run at a determined position.

Figure 2:
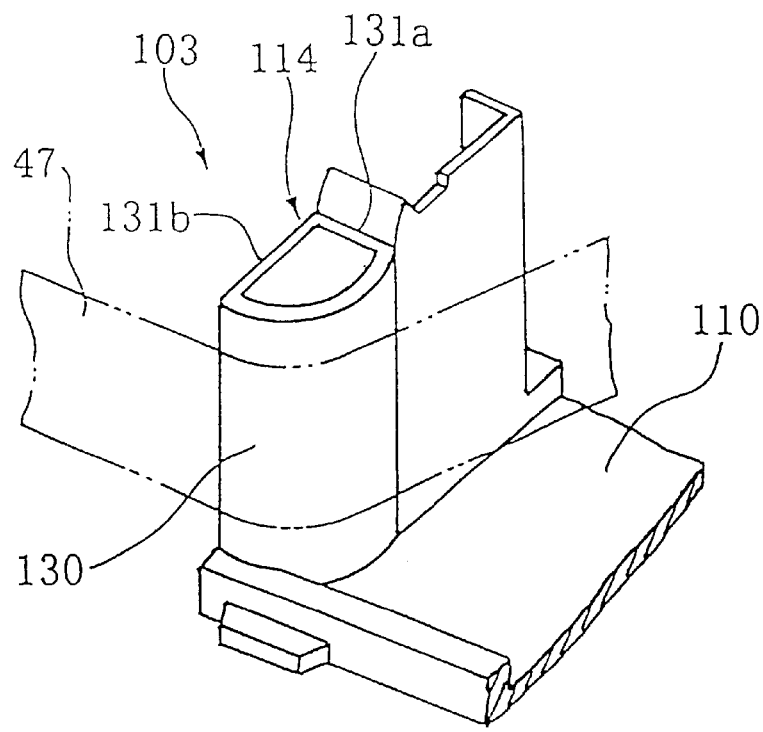
FIG. 2 is a view showing a tape guide of a lower cassette half in FIG. 1.

FIG. 2 shows one of the tape guide 114 provided in the lower cassette half 103 as shown in FIG. 1. The tape guide 114 in a cylindrical shape is integrally formed with a flat plate 110 of the lower cassette half 103. The tape guide 114 includes a curved portion 130 with which the magnetic tape 47 slidably contacts, a flat portion 131a at a rear end side of the tape guide 114 (opposite to a side facing with a head of a hardware when the magnetic tape cassette is loaded in the hardware, that is, an upper side in the drawing) with which the magnetic tape does not contact, and a flat portion 131b at an inner side of the tape guide (facing with the other tape guide, that is, on a left hand in the drawing). One end of the flat portion 131a and one end of the flat portion 131b are in a right angle with each other when seen in a plan view. The other end of the flat portion 131a and the other end of the flat portion 131b are connected by way of the curved portion 130 which is composed of a curved face projecting outwardly in a radial direction.

In this embodiment, a thickness of the curved portion 130 of the tape guide 114 is larger than those of the flat portions 131a and 131b.

Figure 3:
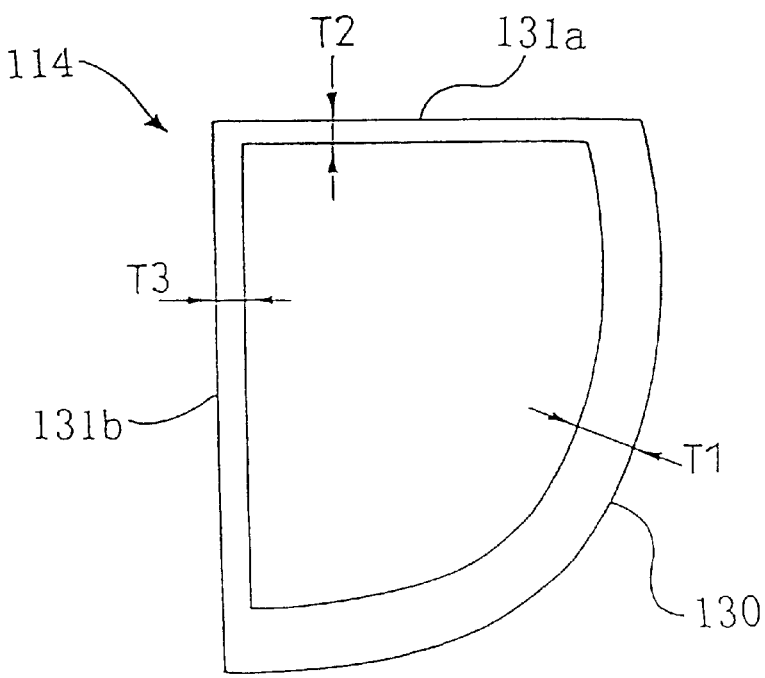
FIG. 3 is a plan view of the tape guide as shown in FIG. 2.

FIG. 3 is a plan view of the tape guide 114 as shown in FIG. 2. In the tape guide 114 as shown in FIG. 3, the thickness T2 of the flat portion 131a at the rear end side of the tape guide is substantially the same as the thickness T3 of the flat portion 131a at the inner side of the tape guide. And the thickness T1 of the curved portion 130 is formed larger than the thicknesses T2 and T3.

Though specific dimensions of the thicknesses vary depending on types of the magnetic tape cassettes, in a DVC of a larger size (an L size), for example, it can be set that T1=0.8 mm, T2=T3=0.4 mm.

With the magnetic tape cassette 100 of the above described structure, a molten resin fills at first a cavity for the curved portion 130 which is wider and easier to receive a flow of the resin, and then, fills cavities for the flat portions 131a, 131b. Accordingly, two streams of the resin will not be joined to each other in the cavity for the curved portion 130, so that molding defects such as welds or air bubbles will not be generated on a surface of the curved portion 130 of the tape guide 114.

It is to be noted that the magnetic tape cassette of the invention is not limited to the above described embodiment, but appropriate modifications and improvements are possible.

For example, the tape guide 114 is formed in a cylindrical shape along its entire heights in the above described embodiment. However, the tape guide 114 may have a solid part, or may be provided with a lid member for covering a distal end of the tape guide.

Figure 4:
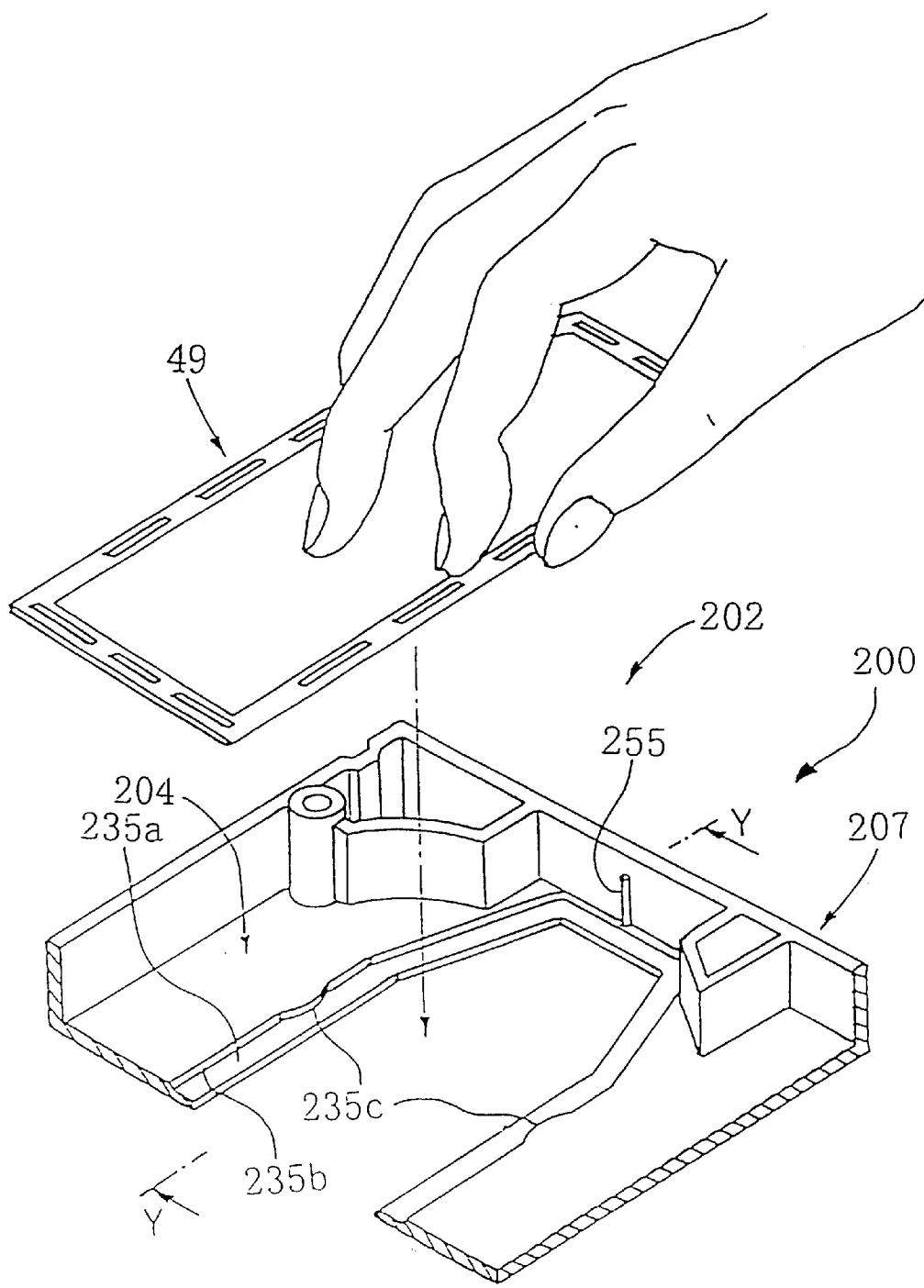
FIG. 4 is a view showing a state in which a window member is fitted to an upper cassette half of a magnetic tape cassette according to a second embodiment of the invention.

FIG. 4 shows a state in which a window member is placed on a flat plate of an upper cassette half in a second embodiment of the invention so as to close an opening formed in the flat plate when the window member is welded to the upper cassette half. The flat plate 204 of the upper cassette half 202 is formed with a window supporting face 235a at a circumferential edge of the opening. When the window member 49 has been placed on the flat plate 204, the window supporting face 235a is adapted to support a circumferential edge of the window member 49. In this embodiment, a larger part of a side face 235b which connects an inner face of the flat plate to the window supporting face 235a is formed in a tapered face as an introducing face, except a part of the side face 235b extending in a transverse direction of the upper cassette half 202 which is formed in a curved convex face 235c perpendicular to the inner face of the flat plate so as to clamp the window member to position it at an accurate position.

Moreover, at an inner face (a face adjacent to a space inside the cassette case) of a peripheral wall (a rear end wall) 207 of the upper cassette half 11, is formed a positioning rib 255 which extends up to a height more than a half of a height of the peripheral wall. In this embodiment, a shape of the positioning rib 255 is semi-circular in section, but the shape is not particularly limited. The positioning rib having a triangular or other multangular shape in section can be also employed.

Figure 5:
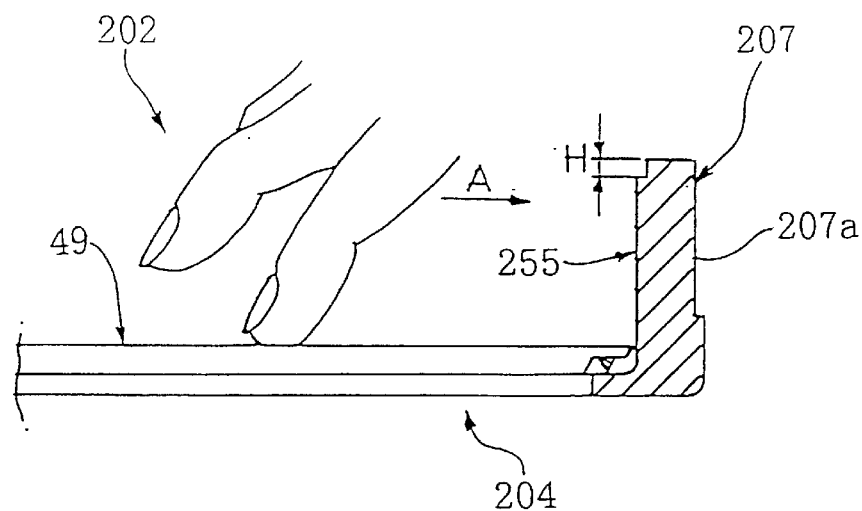
FIG. 5 is a sectional view taken along a line Y—Y in FIG. 4 when the window member has been placed on the upper cassette half.

FIG. 5 shows a sectional view taken along a line Y—Y in FIG. 4 when the window member 49 has been placed on the flat plate 204. As shown in FIG. 5, at an outer face of the peripheral wall (the rear end wall) 207 of the upper cassette half 202, is formed a recessed portion 207a to which a label is to be attached. At an inner face of a base portion of the peripheral wall 207, a part of the circumferential edge of the window member 49 is abutted against a lateral face of the positioning rib 255 so that the window member 49 maybe disposed at an accurate position on the flat plate 204.

The lateral face of the positioning rib 255 is formed perpendicular to the inner face of the flat plate. A difference H between the height of the peripheral wall 207 and the height of the positioning rib 255 is set to be 0.5 mm in this case.

When the window member 49 is released from the hand after it has been positioned at the accurate position, it is preferable to slide the fingers or the like which are in contact with the window member 49 along the window member 49 by withdrawing the hand toward the peripheral wall 207 in a direction of an arrow A in the drawing. In this manner, a part of the circumferential edge of the window member 49 can be kept in contact with the positioning rib 27, and the window member 49 can be prevented from floating up from the flat plate 25.

Figure 6:
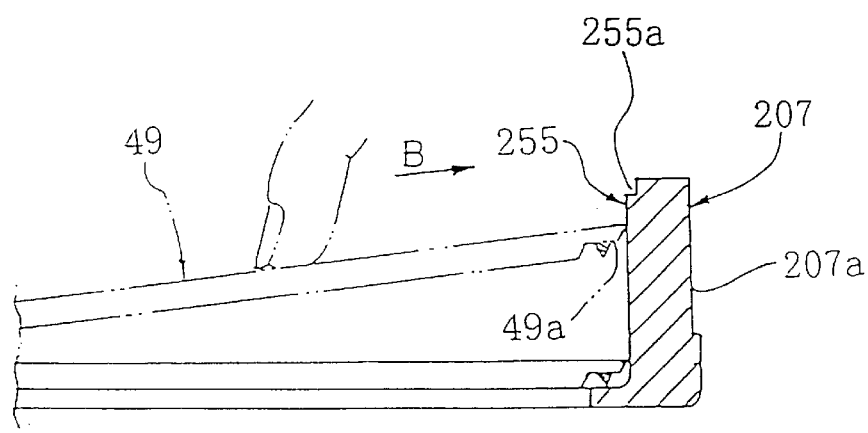
FIG. 6 is a view showing a state in which a finger is detached from the window member shown in FIG. 5.

When the window member 49 which has been once positioned at the accurate position is caused to float in the air as shown in a two-dot chain line in FIG. 6, the supported face 49a of the window member 49 will not ride on an upper face 255a of the positioning rib 255. Because a part of the circumferential edge of the window member 49 which has floated up is kept in contact with the lateral face of the positioning rib 255 in this embodiment, the window member 49 can be released from the hand by withdrawing the hand toward the peripheral wall 207 provided with the positioning rib 255 in a direction of an arrow B in the drawing so as to slide the fingers which are in contact with the window member 49 along the window member 49. The window member 49 released from the hand is guided by the lateral face of the positioning rib 255 and placed again at the accurate position on the flat plate as shown in a solid line in FIG. 6.

In the magnetic tape cassette of the above described structure, the window member 49 can be easily placed at the accurate position on the flat plate 204 on occasion that the window member 49 is welded to the flat plate 204 of the upper cassette half 202.

Further, as compared with the upper cassette half in the conventional magnetic tape cassette, the magnetic tape cassette according to this embodiment is modified only by providing a single thin positioning rib 255 on the peripheral wall 207, and therefore, a structure of the mold will not be complicated. Moreover, the molding defects such as a molding sink, etc. will not be generated on the outer face of the peripheral wall.

It is to be noted that the magnetic tape cassette is not limited to the above described embodiment, but appropriate modifications and improvements are possible.

For example, the positioning rib 255 is provided on the rear end wall 207 of the upper cassette half 202 in the above described embodiment, but the positioning rib may be provided on side walls or the like of the upper cassette half according to shapes, etc. of the window member and the opening.

Moreover, though the window member 49 is placed by hand on the flat plate 204 of the upper cassette half 202 in the described embodiment, it is possible to carry out this work automatically.

Figure 7:
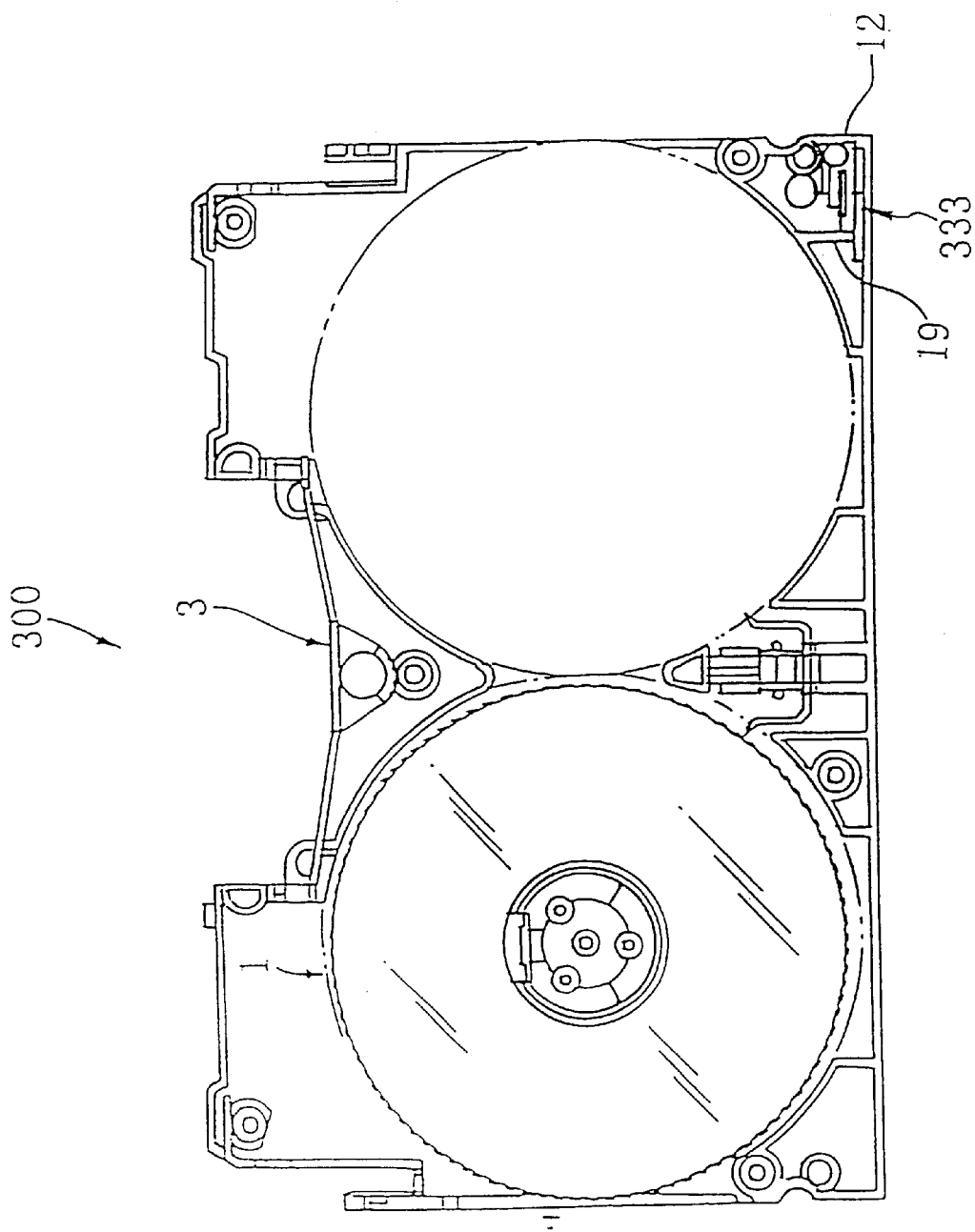
FIG. 7 is a plan view showing a lower cassette half in a magnetic tape cassette according to a third embodiment of the invention.

FIG. 7 shows a lower cassette half according to the third embodiment of the invention. A magnetic tape cassette 300 comprises a pair of tape reels 1 (a tape reel at a right hand in the drawing is omitted to be illustrated) wound with a magnetic tape (not shown) which are rotatably supported on a lower cassette half 3 which is in a pair with an upper cassette half (not shown). The lower cassette half 3 is integrally formed of a synthetic resin such as an ABS resin or the like.

An ID board 333 for identifying a type and a use of the magnetic tape is provided in the lower cassette half 3 at its lower corner part at a right hand in FIG. 7. The ID board 333 is located in the lower cassette half 3 at a position enclosed by a side wall 12 and a partition rib 19.

The ID board 333 has a plurality of (four in FIG. 8) contacts 336a to 336d. These contacts 336a to 336d are exposed through an opening (not shown) formed at the corner of the lower cassette half, and signals concerning the type and use of the magnetic tape cassette will be exchanged with a recording and reproducing apparatus (a hardware) which is not shown, by way of the contacts 336a to 336d.

Figure 8:
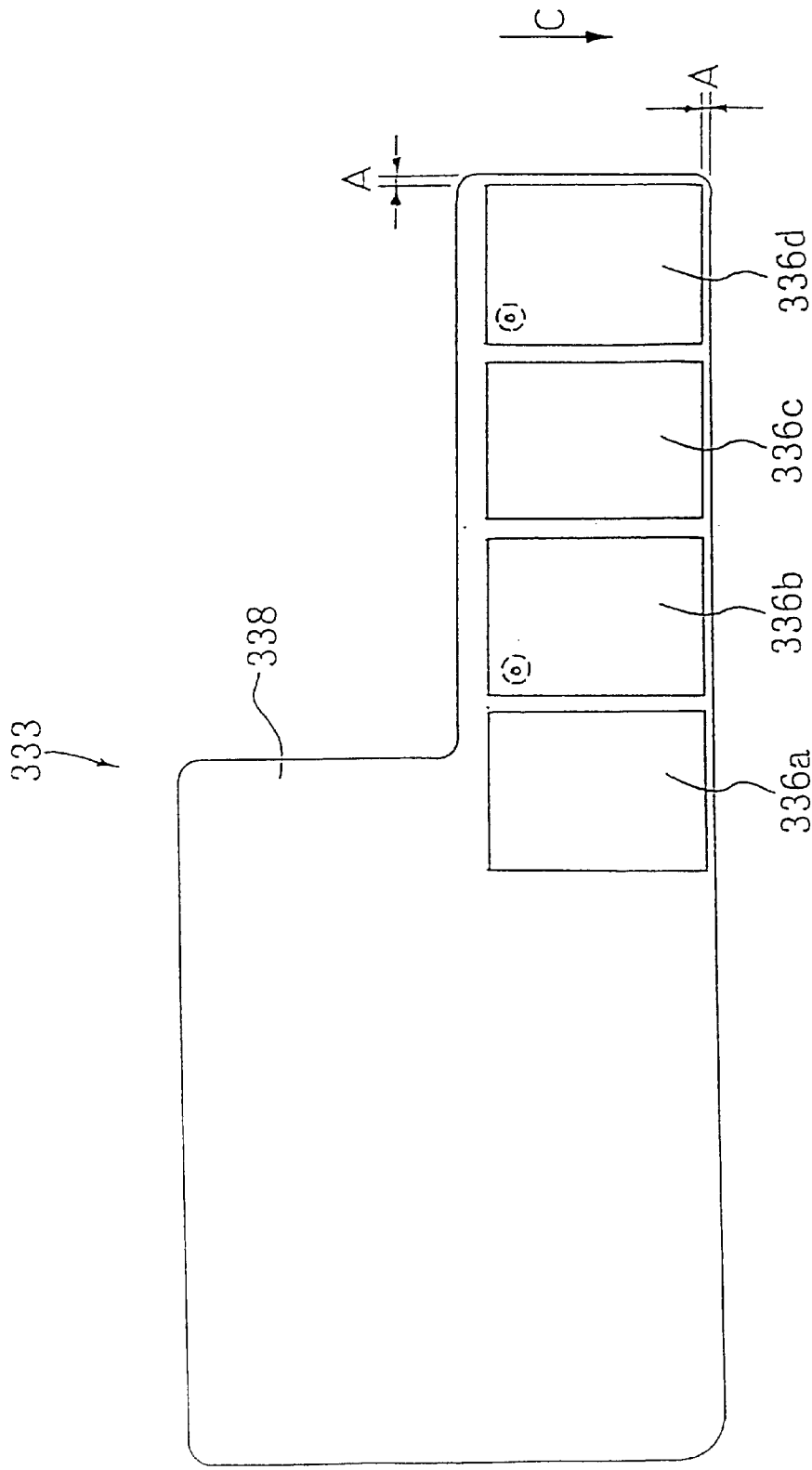
FIG. 8 is a plan view showing an ID board of the magnetic tape cassette in FIG. 7.

Of the contacts 336a to 336d of the ID board 333, a first contact 336a located at the leftmost end in FIG. 8 acts for identifying a thickness of the magnetic tape, a second contact 336b located in a second place from the left in FIG. 8 acts for identifying the type of the magnetic tape, a third contact 336c located in a third place from the left in FIG. 8 acts for identifying the use of the magnetic tape, and a fourth contact 336d located at the rightmost end in FIG. 8 acts for grounding (GND).

In short, the thickness of the magnetic tape can be identified by reading a resistance value between the first contact 336a and the fourth contact 336d by means of the hardware. The type of the magnetic tape can be identified by reading a resistance value between the second contact 336b and the fourth contact 336d by means of the hardware. Further, the use of the magnetic tape can be identified by reading a resistance value between the third contact 336c and the fourth contact 336d by means of the hardware.

The above described ID board 333 is manufactured through the following steps:

First of all, a copper foil is applied to a printed circuit board 338 formed of a substrate material such as a glass reinforced epoxy resin or the like, and after a desired pattern has been printed (etched), the copper foil on unnecessary parts is removed, thereby to form the copper foil of a desired shape (rectangular in FIG. 8) on the printed circuit board 338 which constitutes the contacts 336a to 336d. Then, rinsing the printed circuit board 338, a plating treatment by gold is conducted on the copper foil. The plating treatment on the copper foil by gold will prevent detection faults due to repeated sliding contacts with the hardware. The printed circuit board 338 is formed by a stamping work by means of a stamping die into a desired shape (flat plate like and substantially L-shaped as seen in a plan view in FIG. 8) which is suitable for enabling it to be contained in the lower cassette half.

Figure 9:
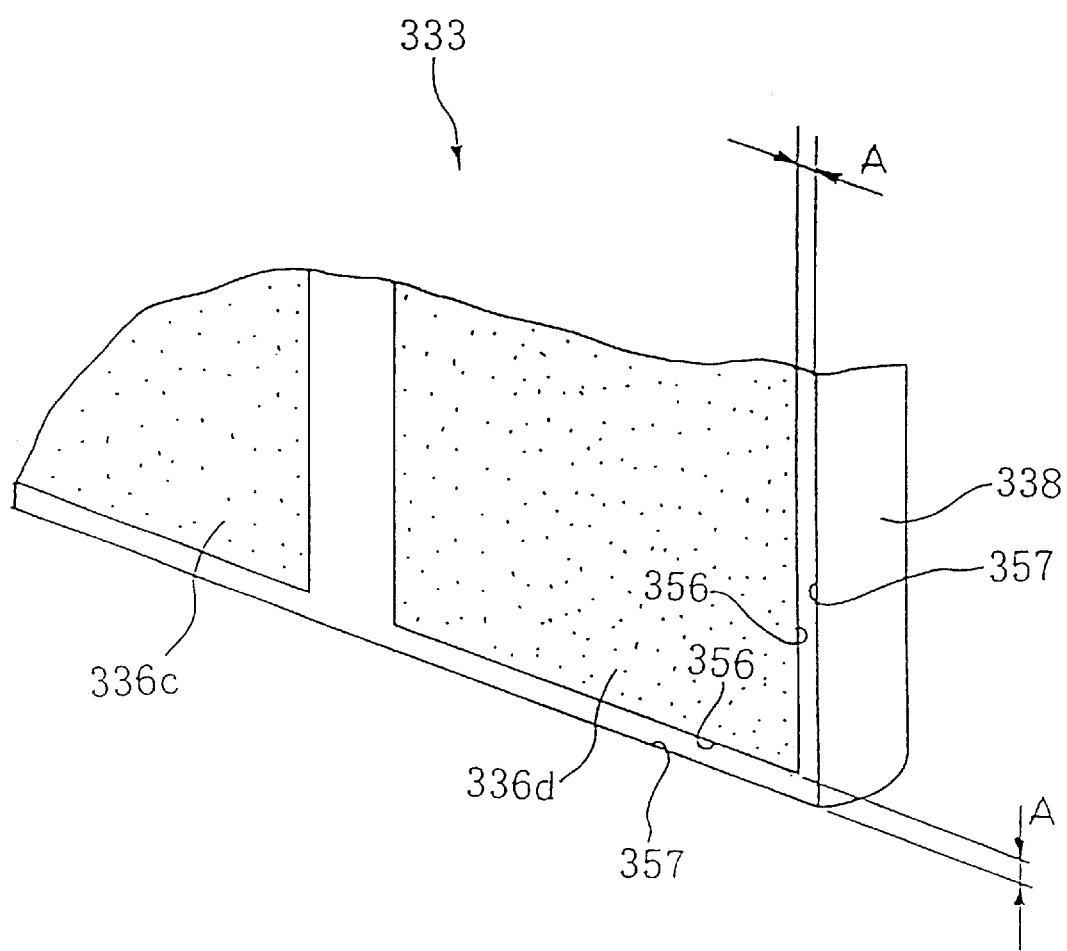
FIG. 9 is an enlarged perspective view of an essential part of the ID board in FIG. 8.
Figure 22:
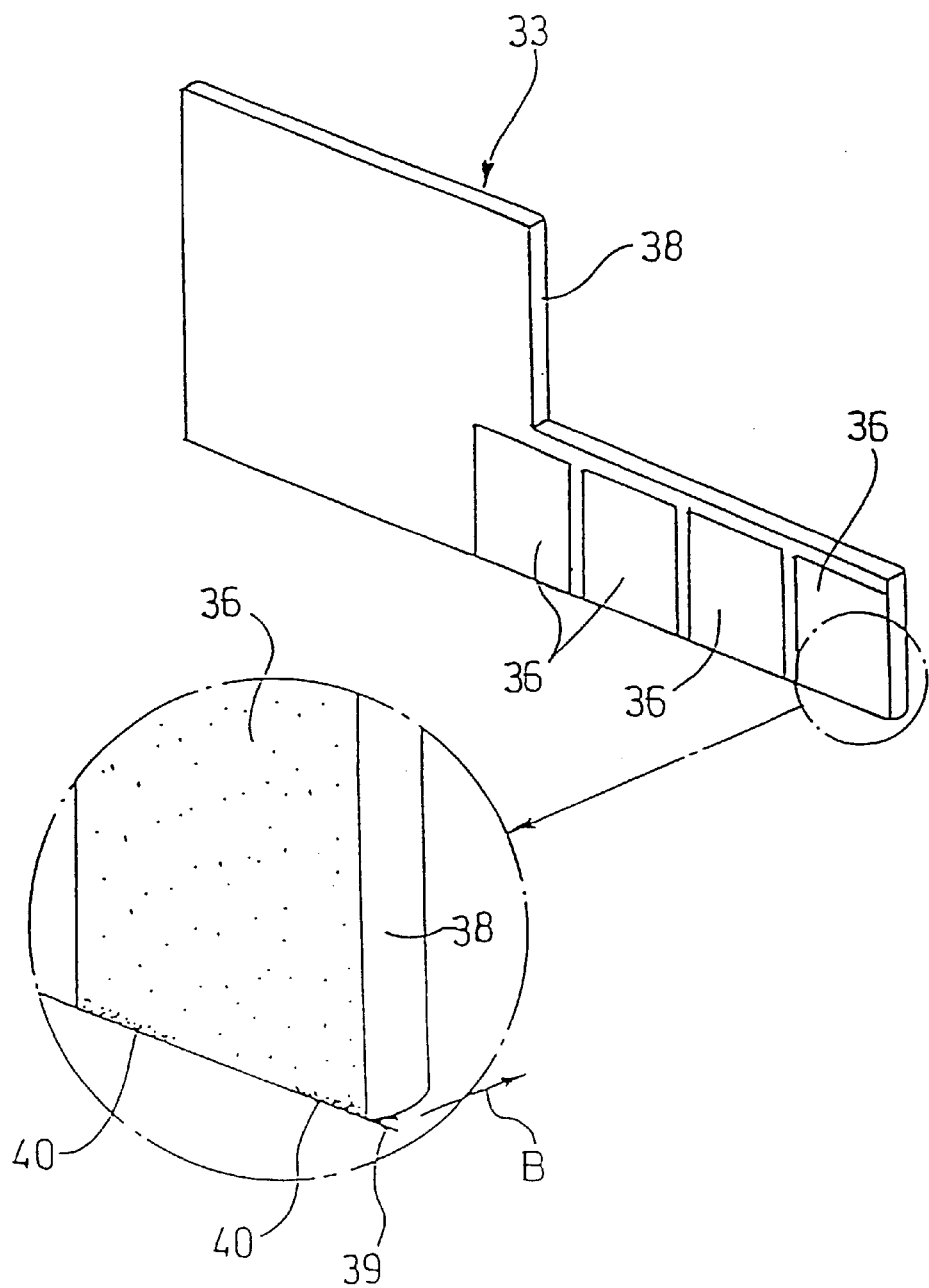
FIG. 22 is a perspective view of the ID board in FIG. 21, and an enlarged perspective view of an essential part thereof.
Figure 23:
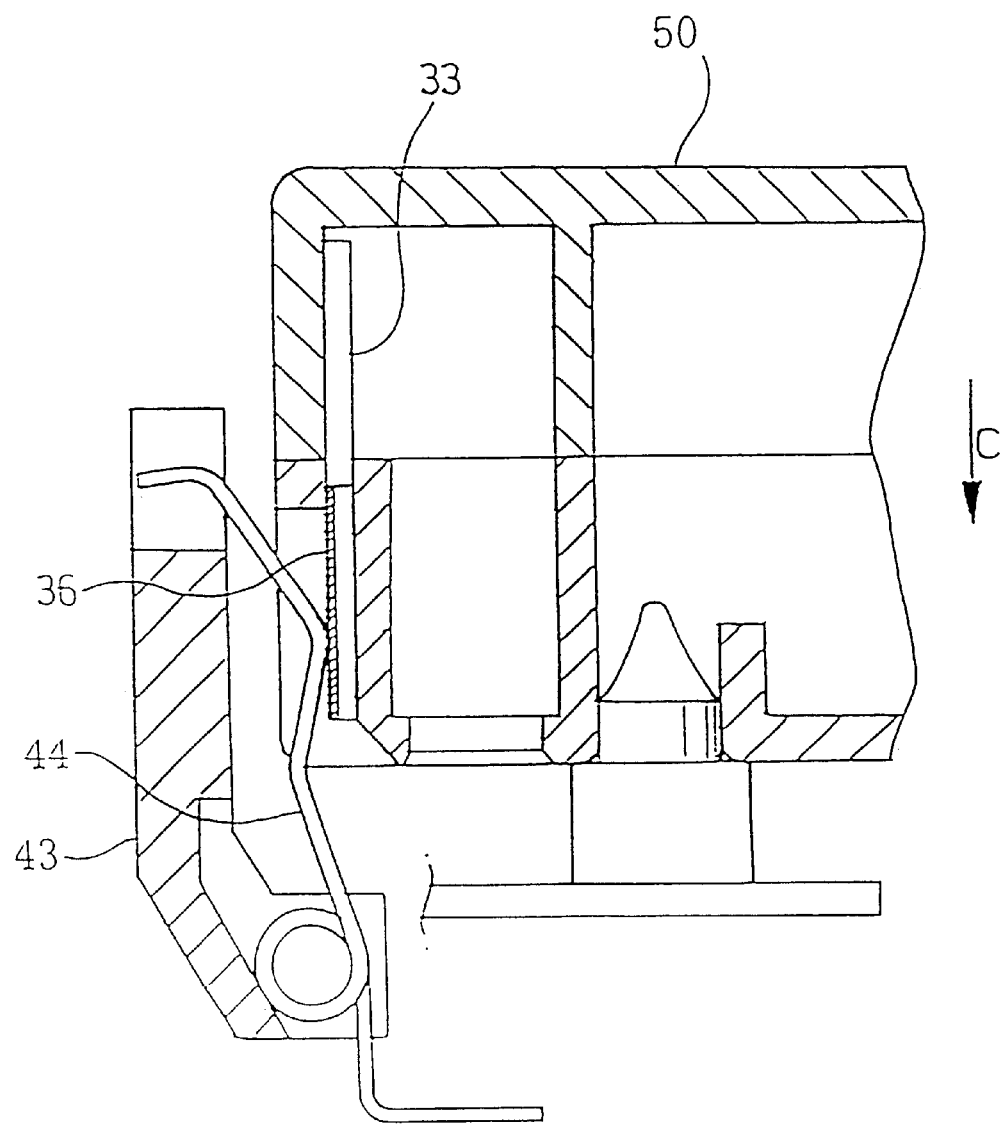
FIG. 23 is a sectional view of the magnetic tape cassette surrounding the ID board when it has been loaded in the hardware.
Figure 25:
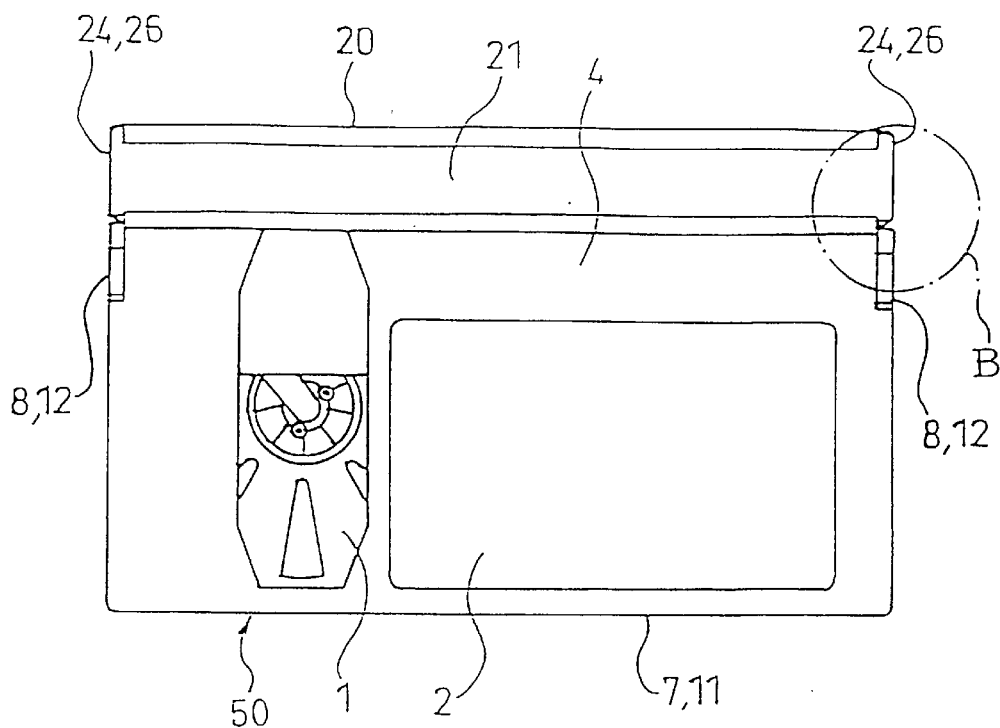
FIGS. 25A and 25B are a plan view of the conventional magnetic tape cassette, and an enlarged plan view of an essential part thereof respectively.
Figure 25:
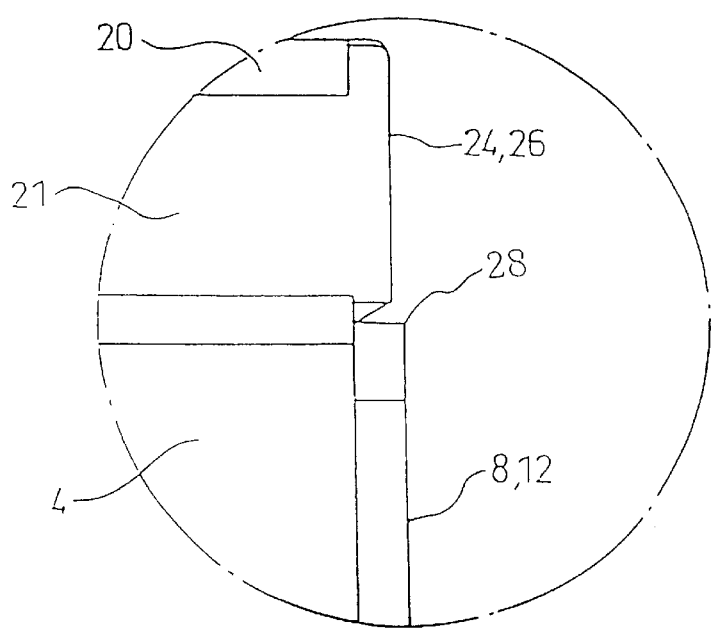
Figure 26:
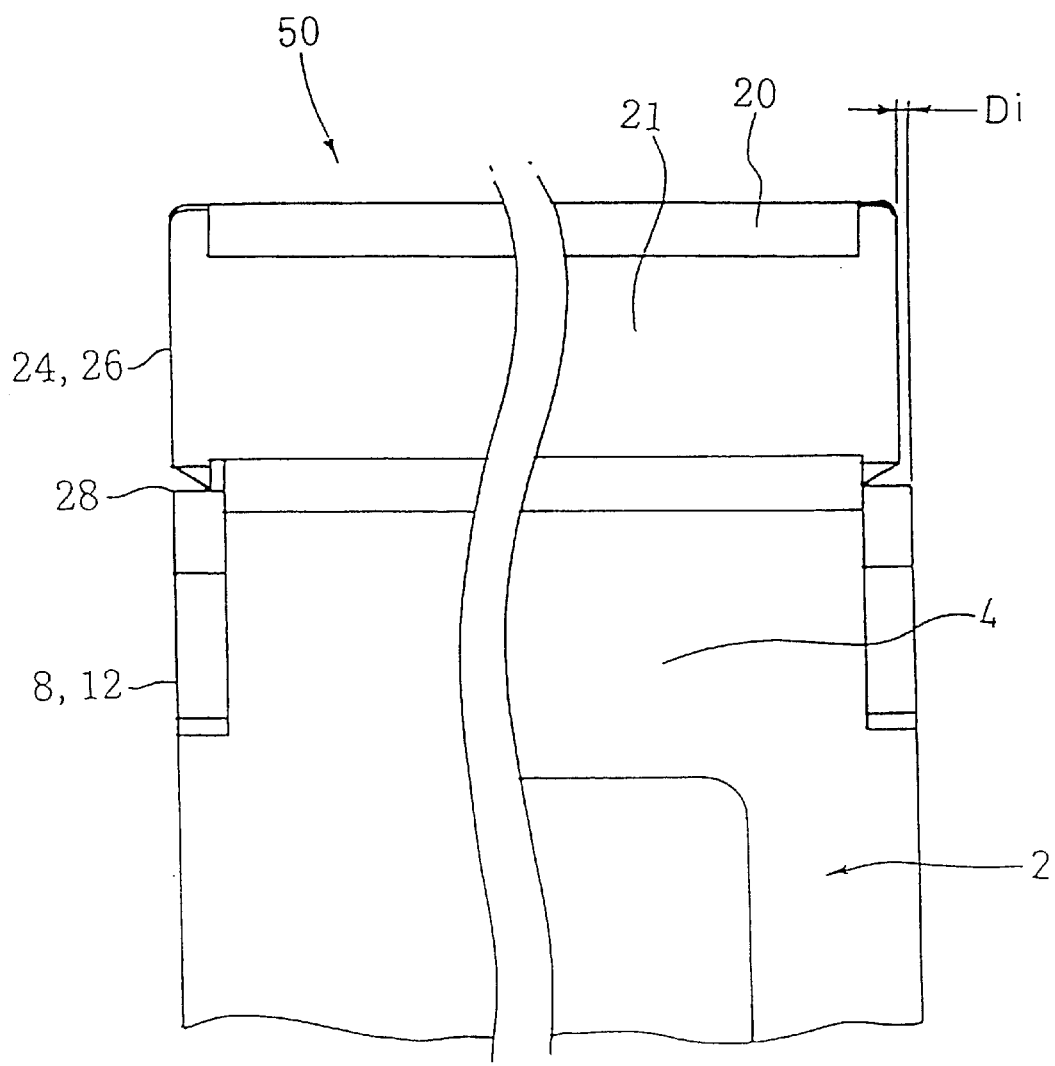
FIG. 26 is a schematic plan view of the conventional magnetic tape cassette when a lid portion has been displaced.

As shown in FIG. 9, a determined distance A is maintained between end portions 356 (end portions adjacent to end faces of the board 338, a lower and a right hand ends in the drawing) of the contact 336d having the gold plating on the copper foil of the ID board 333 and end faces 357 of the printed circuit board 338. In this embodiment, the distance A is 0.1 mm. By thus maintaining the distance A, even in case where the minute burr 39 (refer to FIG. 22) is generated on the printed circuit board 338 at the stamping work of the printed circuit board 338 by means of the stamping die, the partial damage 40 or the like (refer to FIG. 22) of the gold plating caused by the burr 39 will be reliably prevented.

According to the above described embodiment, because the determined distance A is maintained between the ends 356 of the gold plated part on the copper foil of the ID board 333 and the end faces 357 of the printed circuit board 338, even when the minute burr 39 is generated at the stamping work of the printed circuit board 338 by means of the stamping die, the partial damage 40 or the like of the gold plating caused by the burr 39 will be reliably prevented. Accordingly, even in case where the magnetic tape 300 is repeatedly loaded in and unloaded from the hardware, the printed circuit board 338 can be reliably prevented from shorts.

Figure 10:
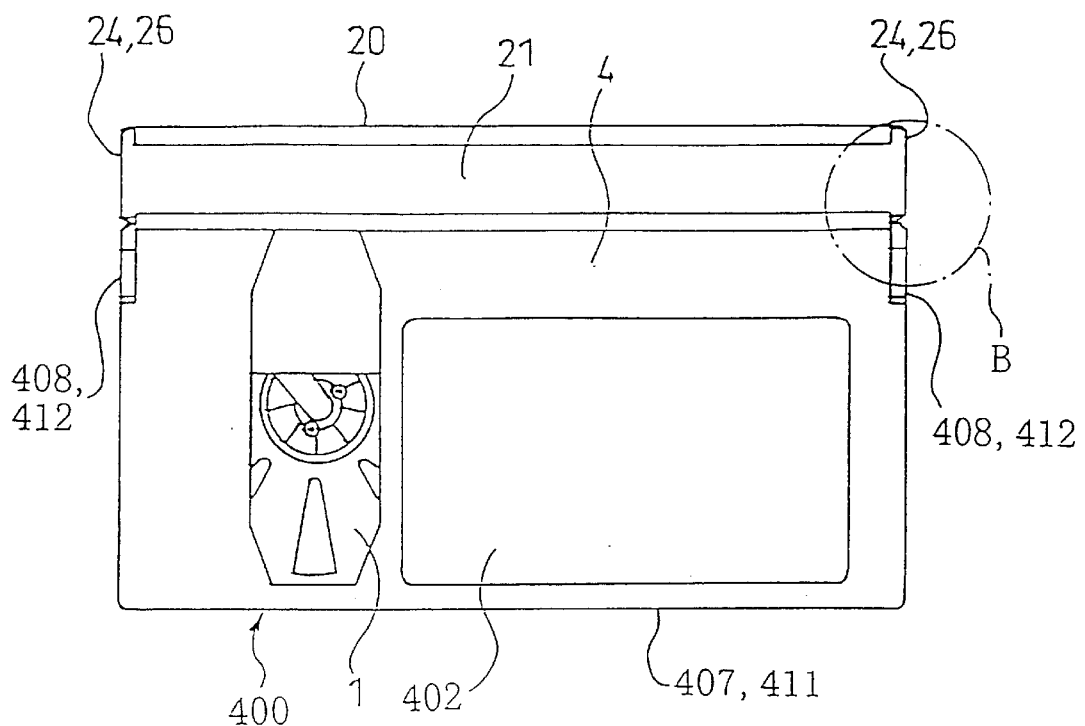
FIGS. 10A and 10B are a plan view of a magnetic tape cassette according to a fourth embodiment of the invention, and an enlarged plan view of an essential part of the magnetic tape cassette respectively.
Figure 10:
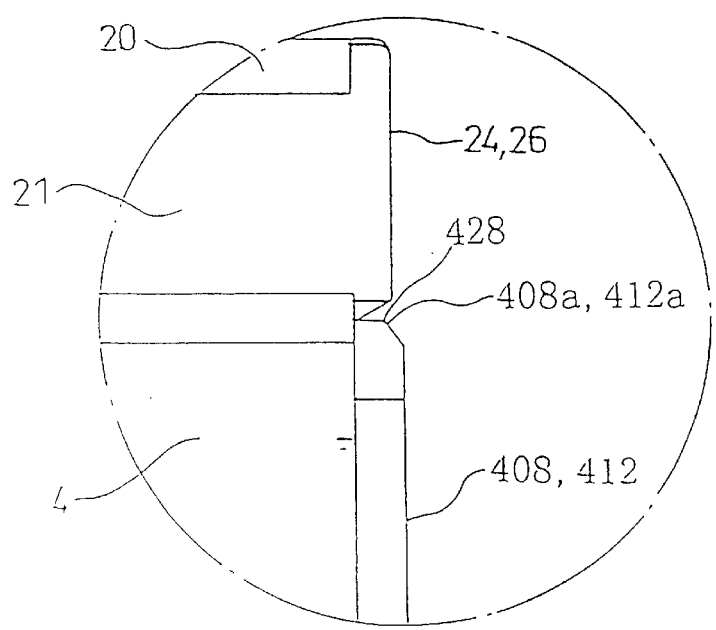

FIGS. 10A and 10B show a magnetic tape cassette according to the fourth embodiment of the invention. FIG. 10A is a plan view of the magnetic tape cassette 400, and FIG. 10B is an enlarged view of an encircled part B in FIG. 10A.

The magnetic tape cassette 400 comprises a left and a right side walls 408 which are located at the outermost positions of the upper cassette half 402 in a longitudinal direction of the cassette, and similar sidewalls 412 in the lower cassette half. Near forward ends 428 of side faces (outer faces) of the side walls 408, 412, there are formed cut away portions 408a, 412a in a tapered shape which are oriented toward an inner space of the cassette-case as approaching to the forward end 428. Of the cut away portions 408a and 412a, the forward ends 428 of the side walls which are the closest to the lids 24, 26 are so adapted as to be always positioned inward of the left and the right lid side faces 24 of the outer lid 20 and the left and the right lid side faces 26 of the top lid 21, as viewed in a longitudinal direction of the cassette case.

In other words, the forward ends 428 of the side faces of the side walls are so adapted to be positioned closer to the inner space of the cassette case than the left and the right lid side faces 24, 26 of the outer lid 20 and the top lid 21.

Figure 11:
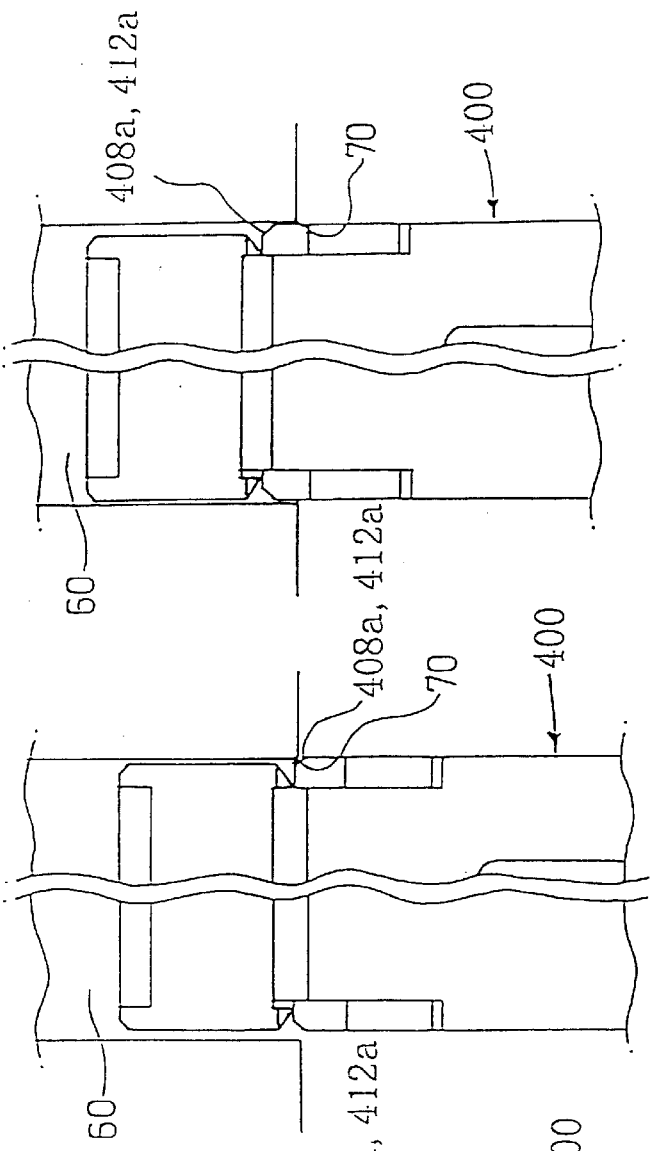
FIGS. 11A, 11B and 11C are views showing a manner in which the magnetic tape cassette is loaded in a cassette loading mouth of a hardware.
Figure 12:
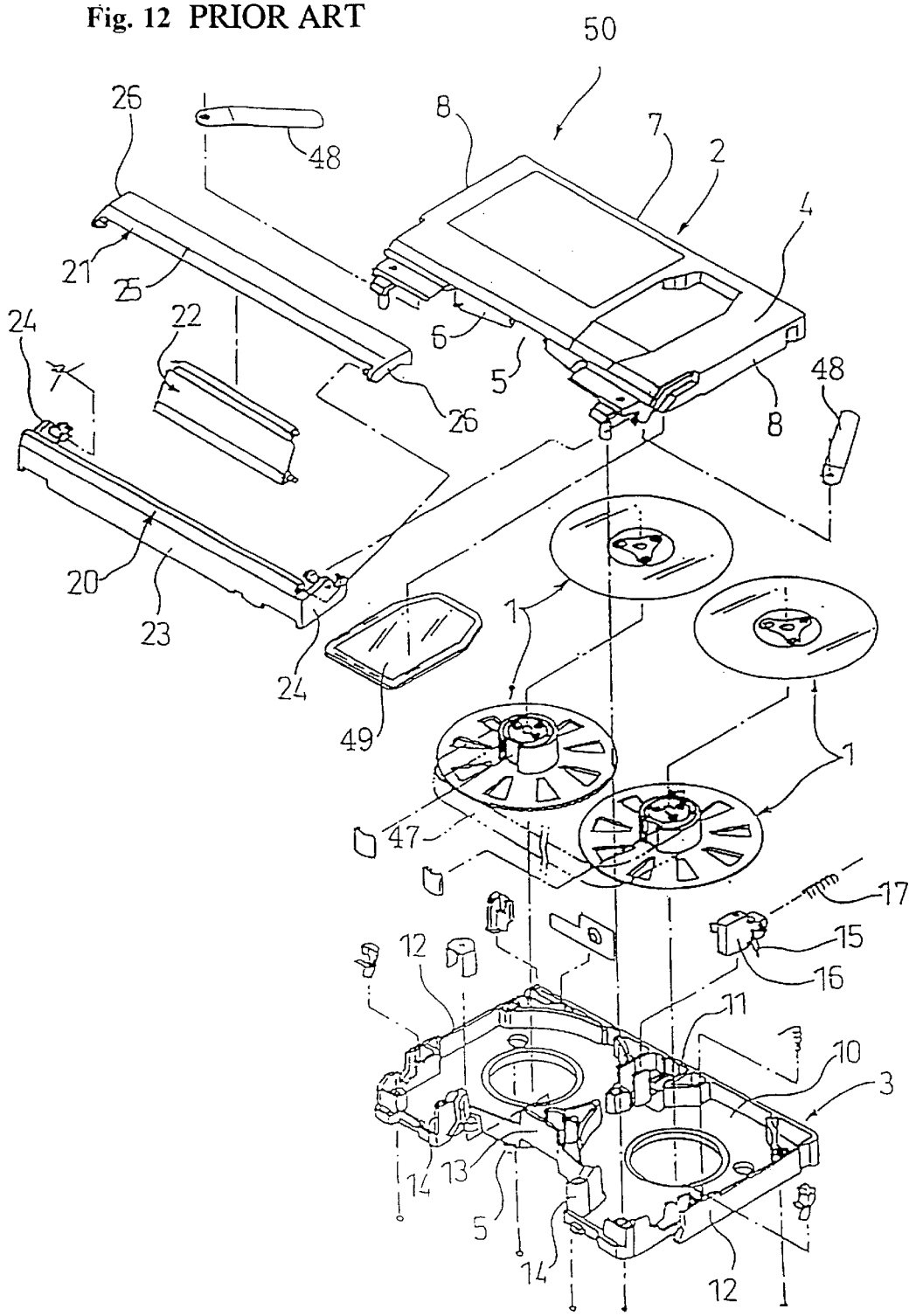
FIG. 12 is an exploded perspective view showing a conventional magnetic tape cassette.
Figure 13:
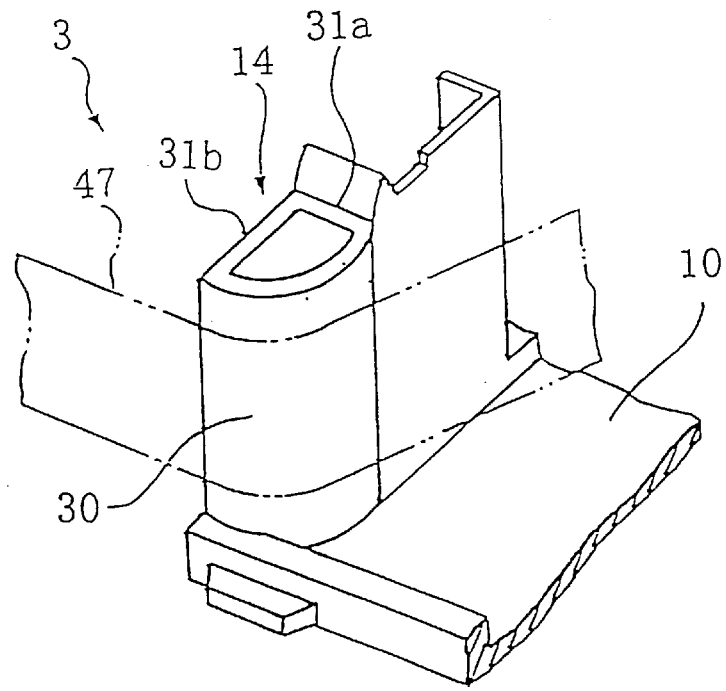
FIG. 13 is a view showing a tape guide of a lower cassette half in FIG. 12.
Figure 14:
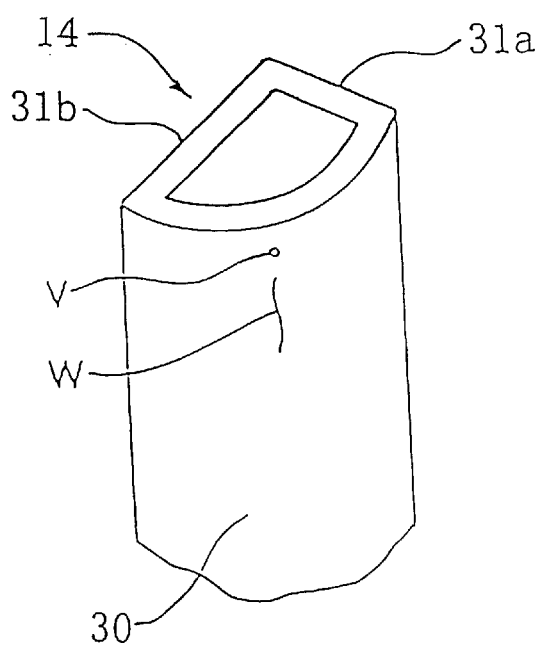
FIG. 14 is a view showing the tape guide in which molding defects have occurred.
Figure 15:
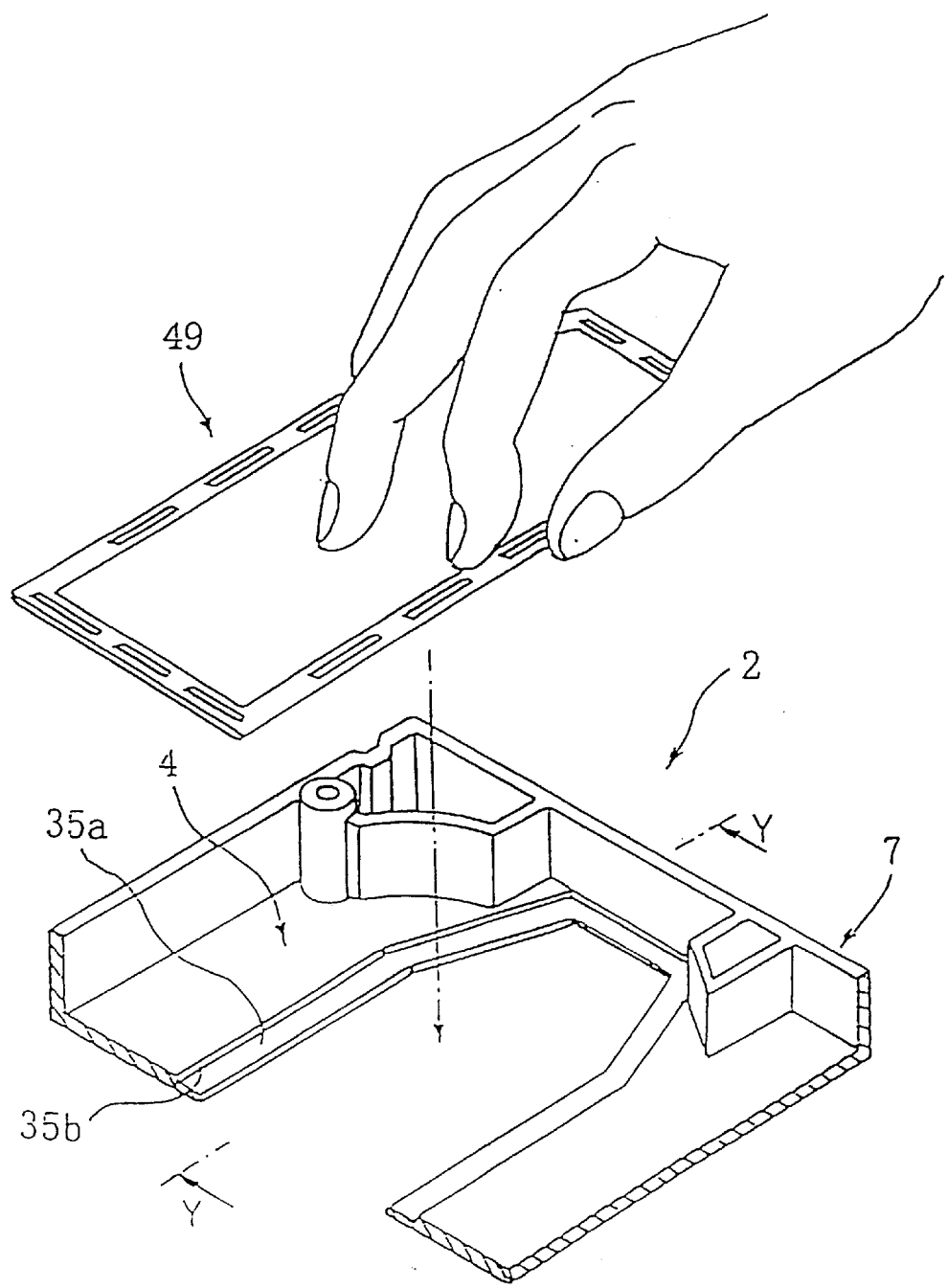
FIG. 15 is a view showing a manner in which a window member is fitted to an upper cassette half of the conventional magnetic tape cassette.
Figure 16:
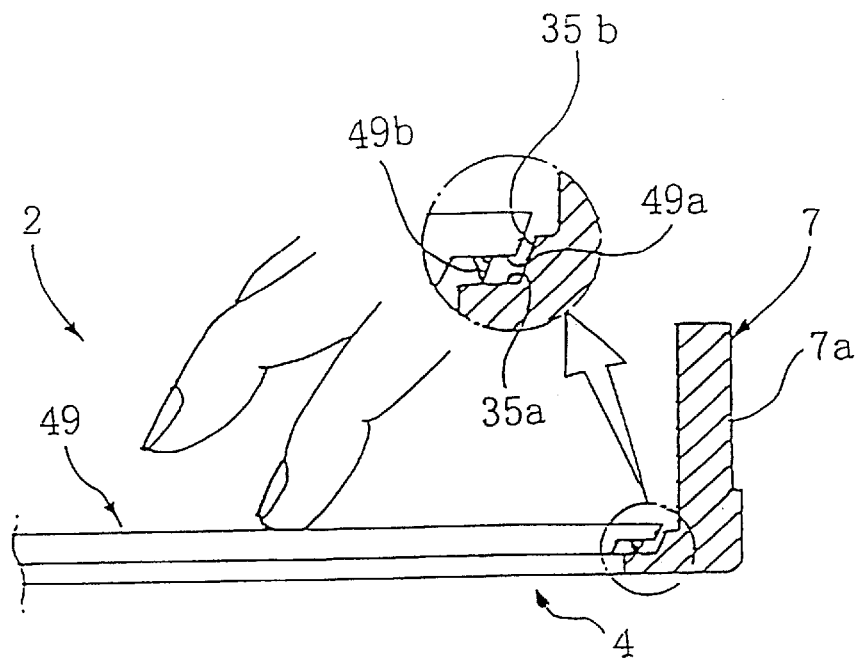
FIG. 16 is a sectional view taken along a line Y—Y in FIG. 15 when the window member has been placed on the upper cassette half.
Figure 17:
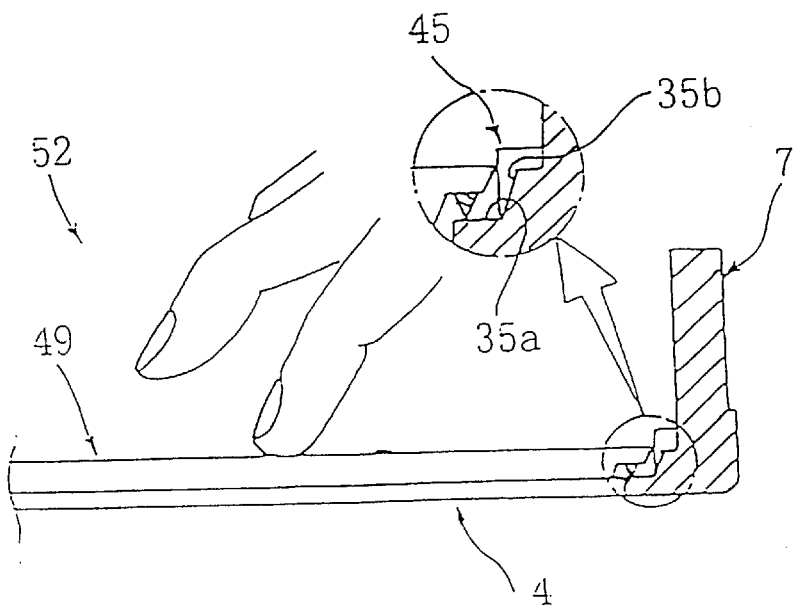
FIG. 17 is a view showing a state in which the window member is placed on another conventional upper cassette half.
Figure 18:
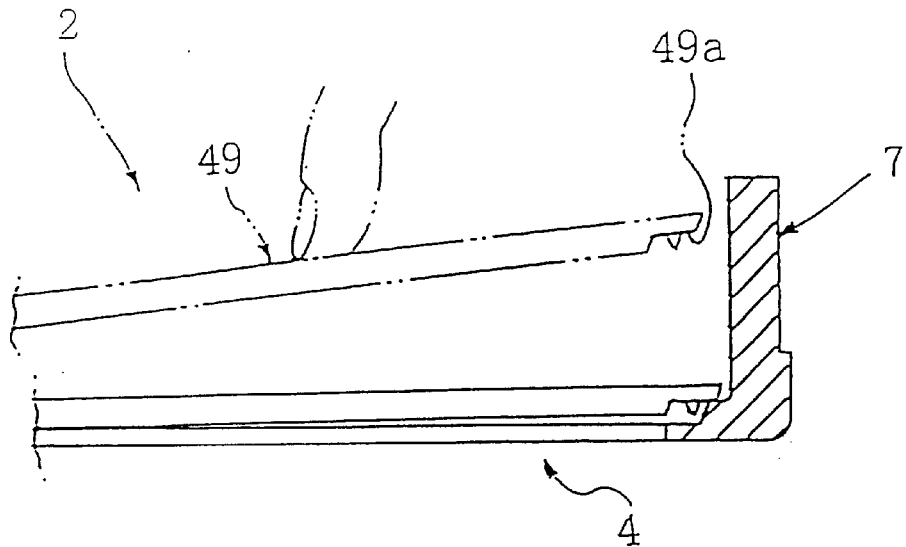
FIG. 18 is a view showing a state in which a finger is detached from the window member shown in FIG. 16.
Figure 19:
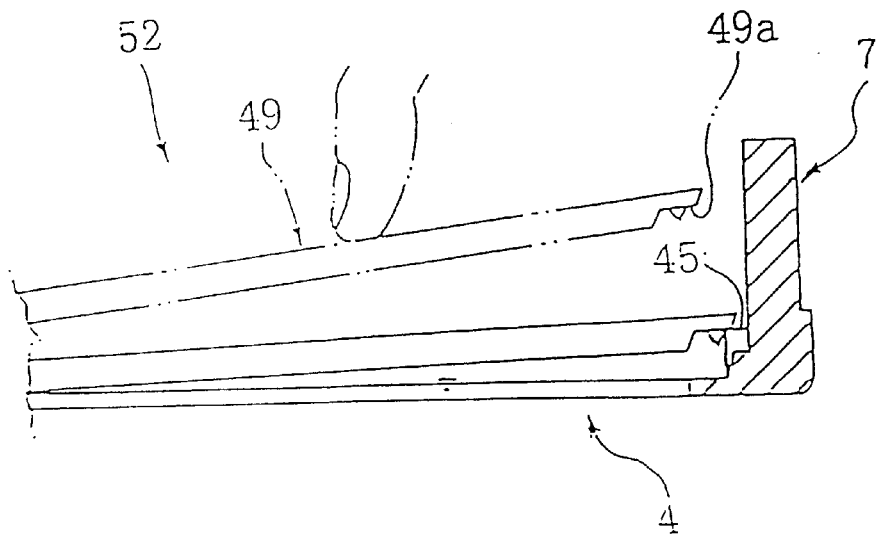
FIG. 19 is a view showing a state in which a finger is detached from the window member shown in FIG. 17.
Figure 20:
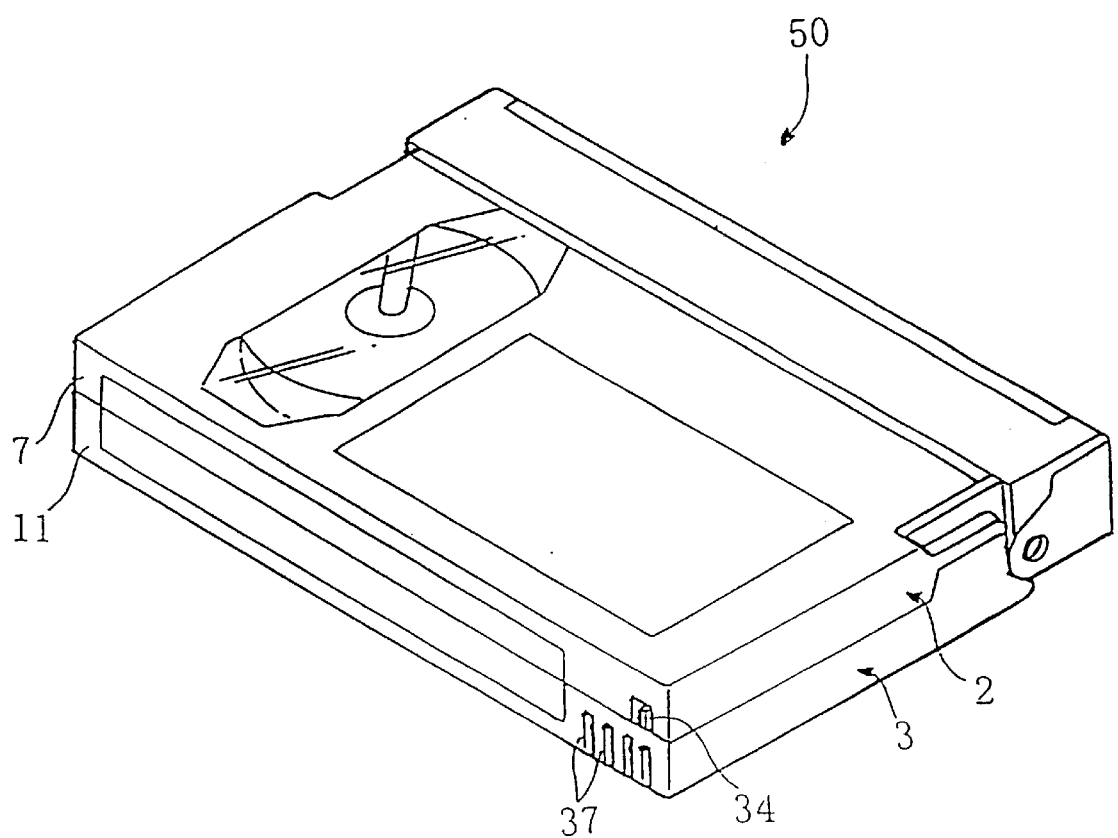
FIG. 20 is a perspective view showing the conventional magnetic tape cassette.
Figure 21:
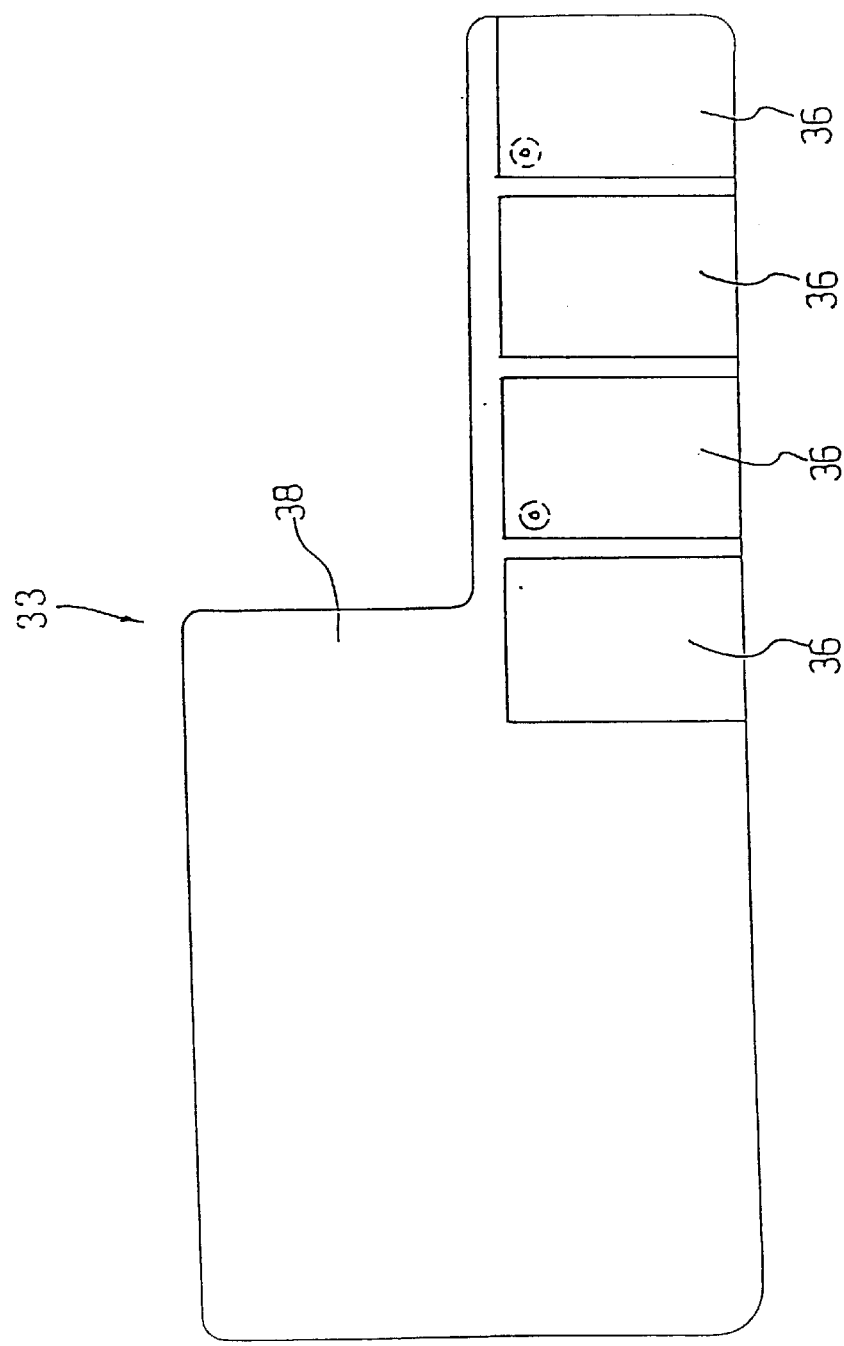
FIG. 21 is a plan view showing an ID board of the magnetic tape cassette in FIG. 20.

Now, referring to FIG. 11, a manner in which the magnetic tape cassette 400 is loaded into the hardware will be described.

FIGS. 11A to 11C show the manner in which the cassette 400 is loaded in a cassette loading mouth 60 of a deck when the lid is displaced to one side at the maximum degree. As shown in FIG. 11A, at a beginning stage of the loading, the cassette 400 is going to be inserted inclinedly with respect to the cassette loading mouth 60. On this occasion, the cut away portions 408a, 412a are abutted against a corner 70 of the cassette loading mouth 60. Proceeding the loading of the cassette 400 from this situation, the cassette 400 is slightly rotated into a state as shown in FIG. 11B. Further proceeding the loading of the cassette 400, the cut away portions 408a, 412a slide on the corner 70, and as a result, the cassette 400 is guided into an interior of the hardware as shown in FIG. 11C.

As described above, even though the cassette 400 is loaded inclinedly with respect to the hardware, the cassette 400 will not be caught by the hardware. Accordingly, it will not be the case that the cassette 400 cannot be taken out of the hardware. On the other hand, in case where the cassette 400 is loaded into the cassette loading mouth 60 of the hardware in a slightly displaced state in a sideward direction, but not inclinedly, the cassette 400 can be smoothly loaded in the hardware because the cut away portions 408a, 412a act as guiding members as in the case where the cassette 400 is inclined.

The invention is not limited to the described embodiment, but appropriate modifications and improvements, etc. are possible. For example, the openable lid is not limited to the lid of three plate type, but may be of two plate type comprising a lid consisting of the outer lid and the top lid so referred to in this embodiment which are integrally formed, and the inner lid. In addition, technical concepts of the invention can be applied to other magnetic tape cassettes than the DVC. Although the invention has been described on the basis of the several embodiments, it is apparent that this invention may comprise combinations of at least two of these embodiments or modifications.

What is claimed is:

1. A magnetic tape cassette which comprises an ID board for enabling a hardware to identify said magnetic tape by bringing contacts on a circuit board of said ID board which are exposed through an opening formed in a lower cassette half into contact with corresponding contacts in said hardware, wherein a plating treatment is provided on said contacts on said ID board, and a determined distance is secured between all end portions of said parts provided with said plating treatment and end faces of said circuit board, and wherein said distance of said ID board at a forward position in a moving direction of said magnetic tape cassette at which said contacts on said ID board are adapted to slidably contact with said contacts in said hardware is set to be 0.05–0.25 mm.

2. The magnetic tape cassette as claimed in claim 1, wherein the circuit board is formed into a desired shape by a stamping operation using a stamping die.

3. A magnetic tape cassette which comprises an ID board for enabling a hardware to identify said magnetic tape by bringing contacts on a circuit board of said ID board which are exposed through an opening formed in a lower cassette half into contact with corresponding contacts in said hardware, wherein a plating treatment is provided on said contacts on said ID board, and a determined distance is secured between all end portions of said parts provided with said plating treatment and end faces of said circuit board, and wherein said distance of said ID board at a forward position in a moving direction of said magnetic tape cassette at which said contacts on said ID board are adapted to slidably contact with said contacts in said hardware is set to be 0.1–0.15 mm.

4. The magnetic tape cassette as claimed in claim 3, wherein the circuit board is formed into a desired shape by a stamping operation using a stamping die.

* * * * *